(12) United States Patent
Tan et al.

(10) Patent No.: US 12,112,400 B2
(45) Date of Patent: Oct. 8, 2024

(54) PAGE DRAWING CONTROL METHOD, APPARATUS, AND DEVICE

(71) Applicant: HUAWEI TECHNOLOGIES CO., LTD., Guangdong (CN)

(72) Inventors: Wei Tan, Helsinki (FI); Tanqi Yu, Shanghai (CN); Qucheng Zhi, Shenzhen (CN); Yu Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 218 days.

(21) Appl. No.: 17/622,650

(22) PCT Filed: Jun. 24, 2020

(86) PCT No.: PCT/CN2020/098250
§ 371 (c)(1),
(2) Date: Dec. 23, 2021

(87) PCT Pub. No.: WO2020/259623
PCT Pub. Date: Dec. 30, 2020

(65) Prior Publication Data
US 2022/0358688 A1    Nov. 10, 2022

(30) Foreign Application Priority Data
Jun. 27, 2019  (CN) .......................... 201910569433.1

(51) Int. Cl.
*G06T 11/00* (2006.01)
*G06F 9/451* (2018.01)

(52) U.S. Cl.
CPC .............. *G06T 11/00* (2013.01); *G06F 9/451* (2018.02)

(58) Field of Classification Search
CPC ........ G06T 11/00; G06F 9/451; G06F 16/958; G06F 8/34; G06F 8/38
See application file for complete search history.

(56) References Cited

U.S. PATENT DOCUMENTS 10,134,314 B2 * 11/2018  Apodaca ................. G09G 3/001
10,679,314 B2 *  6/2020  Pronovost ................. G06T 1/20
(Continued)

FOREIGN PATENT DOCUMENTS

CN   101216762 A    7/2008
CN   106033334 A   10/2016
(Continued)

*Primary Examiner* — Sing-Wai Wu
(74) *Attorney, Agent, or Firm* — WOMBLE BOND DICKINSON (US) LLP

(57) ABSTRACT

Embodiments of this application provide a page drawing control method, apparatus, and device. The method includes: obtaining a drawing instruction for a first page, where the drawing instruction is used to instruct to draw the first page, the first page includes a first control, and the first control includes at least one child control; and if it is determined that an image corresponding to the first control exists and the first control and the child control in the first control are not updated, drawing the first control based on the image corresponding to the first control, or if it is determined that an image corresponding to the first control does not exist or the first control or the child control in the first control is updated, generating the image corresponding to the first control and drawing the first control. In this way, page drawing efficiency is improved.

18 Claims, 20 Drawing Sheets

(56) References Cited

U.S. PATENT DOCUMENTS

| | | | | |
|---|---|---|---|---|
| 2014/0253574 A1* | 9/2014 | Brown | .................. | G06T 1/0007 |
| | | | | 345/545 |
| 2016/0093239 A1* | 3/2016 | Wang | ........................ | G06F 1/32 |
| | | | | 345/55 |
| 2017/0186127 A1* | 6/2017 | Yu | ........................ | G06F 21/6245 |
| 2018/0158219 A1 | 6/2018 | Pagan | | |
| 2019/0361737 A1* | 11/2019 | Hu | ........................ | G06F 9/44526 |

FOREIGN PATENT DOCUMENTS

| | | |
|---|---|---|
| CN | 108319484 A | 7/2018 |
| CN | 109117228 A | 1/2019 |
| CN | 109388465 A | 2/2019 |
| CN | 110515610 A | 11/2019 |
| WO | 2018103218 A1 | 6/2018 |

\* cited by examiner

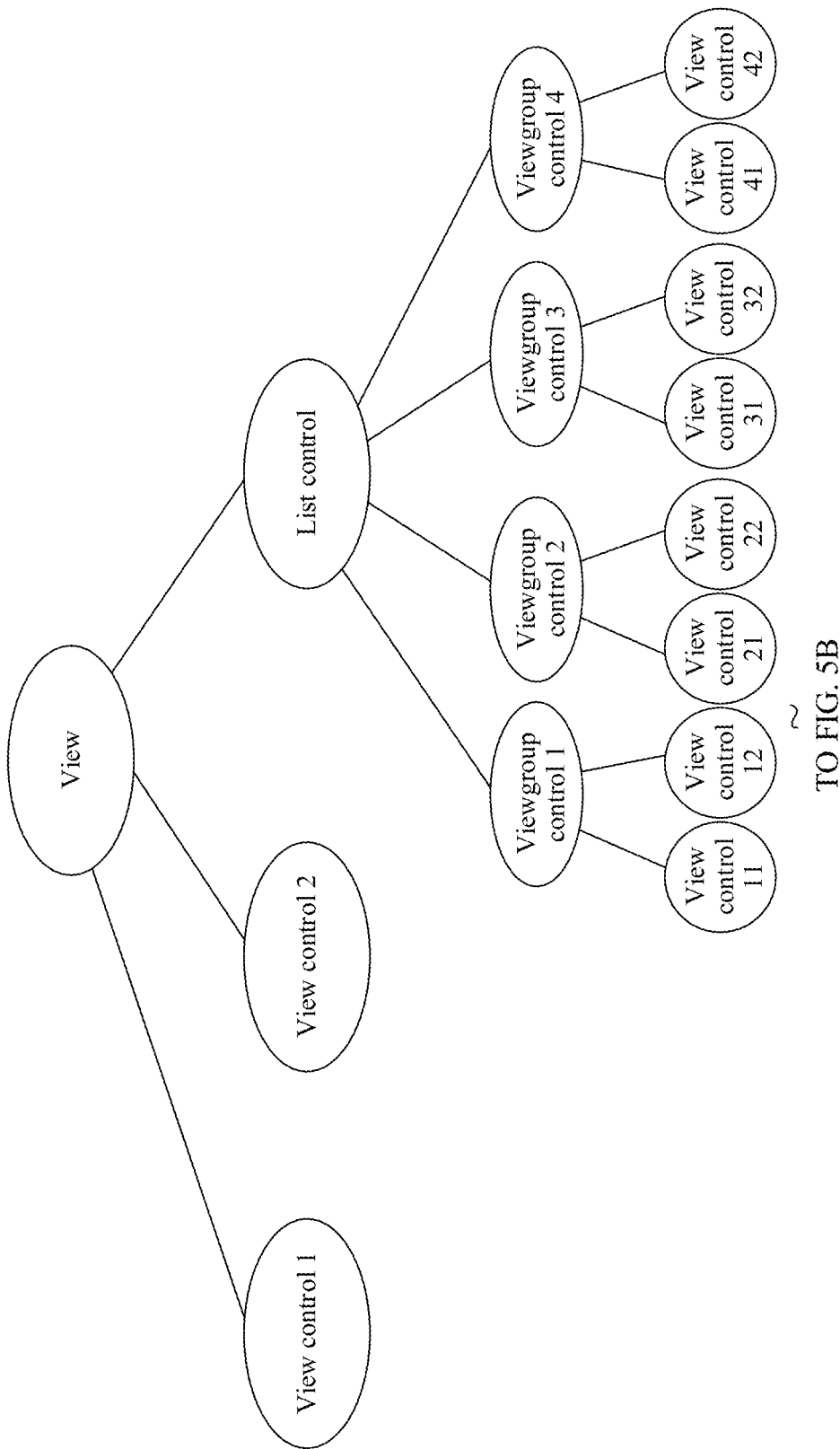

PAGE DRAWING CONTROL METHOD, APPARATUS, AND DEVICE

CROSS-REFERENCE TO RELATED APPLICATIONS

This application is a National Stage of International Application No. PCT/CN2020/098250, filed on Jun. 24, 2020, which claims priority to Chinese Patent Application No. 201910569433.1, filed on Jun. 27, 2019. Both of the aforementioned applications are hereby incorporated by reference in their entireties.

TECHNICAL FIELD

This application relates to the field of computer technologies, and in particular, to a page drawing control method, apparatus, and device.

BACKGROUND

In the Android system, a page displayed by an electronic device usually includes a plurality of controls. The plurality of controls may be separately drawn, so that the electronic device can display the page.

The controls on the page include at least one of a view control and a viewgroup control, and the viewgroup control includes at least one child control (for example, a view control). When drawing the viewgroup control, the electronic device separately draws the viewgroup control and each child control in the viewgroup control. For any page displayed by the electronic device, if content on the page changes (for example, a user performs a flicking operation on the page to change the content on the page), the electronic device periodically draws the page, for example, draws the page once every 16 milliseconds. When drawing the viewgroup control, the electronic device needs to separately draw the viewgroup control and each child control in the viewgroup control. Therefore, a relatively large amount of drawn content is involved. This leads to relatively low page drawing efficiency.

SUMMARY

This application provides a page drawing control method, apparatus, and device, to improve page drawing efficiency.

An embodiment (sometimes referred to as, "a first aspect") of this application provides a page drawing control method, comprising: obtaining a drawing instruction used to instruct to draw a first page, where the first page includes a first control, and the first control includes at least one child control; and if it is determined that an image corresponding to the first control exists and/or the first control and the child control in the first control are not updated, drawing the first control based on the image corresponding to the first control, or if it is determined that an image corresponding to the first control does not exist or the first control or the child control in the first control is updated, generating the image corresponding to the first control and/or drawing the first control.

In the foregoing process, in a page drawing process, for a viewgroup control (the first control) on the page, an image of the viewgroup control may be first generated and/or stored. The image includes an image corresponding to the viewgroup control and an image corresponding to each child control in the viewgroup control. In this way, in the page drawing process, if content in a viewgroup control does not change and/or an image of the viewgroup control exists, the viewgroup control may be drawn based on the image, to reduce drawn content on the page, so as to improve drawing efficiency.

In some embodiments, the first control may be drawn based on the image corresponding to the first control in the following feasible implementation manner: generating an image drawing command corresponding to the image; updating a drawing command in a display list of the first control to the image drawing command; and/or drawing the first control based on an updated display list of the first control.

In the foregoing process, a command included in the updated display list is the image drawing command, and a quantity of pixels that correspond to the image drawing command and that need to be rendered is a quantity of pixels in an area in which the image corresponding to the first control is located. A quantity of pixels that correspond to the drawing command in the to-be-updated display list of the first control and that need to be rendered is greater than the quantity of the pixels in the area in which the image corresponding to the first control is located. Therefore, when the first control is drawn based on the updated display list of the first control, a quantity of drawn pixels can be reduced, to improve drawing efficiency.

In some embodiments, the image corresponding to the first control may be generated in the following feasible implementation manner: obtaining attribute information of the first control, where the attribute information includes a size of the first control, a size of each child control in the first control, and a location of each child control in the first control; and/or obtaining, based on the attribute information and a preset draw function, the image corresponding to the first control.

In the foregoing process, the attribute information of the first control may accurately describe the first control. Therefore, the image corresponding to the first control may be accurately drawn based on the attribute information of the first control and the preset draw function.

In some embodiments, the image corresponding to the first control may be generated and/or the first control may be drawn in the following feasible implementation manner: generating the image corresponding to the first control, and/or drawing the first control based on the generated image corresponding to the first control.

In the foregoing process, when it is determined that the image corresponding to the first control does not exist or the first control or the child control in the first control is updated, the image corresponding to the first control is first generated, and/or the first control is drawn based on the image. In this way, the first control can be quickly drawn based on the image corresponding to the first control.

In some embodiments, the image corresponding to the first control may be generated and the first control may be drawn in the following feasible implementation manner: generating the image corresponding to the first control; obtaining the display list of the first control, where the display list includes a drawing command for the first control and/or a drawing command for each child control in the first control; and/or drawing the first control based on the display list.

In the foregoing process, when it is determined that the image corresponding to the first control does not exist or the first control or the child control in the first control is updated, the image corresponding to the first control is generated, and/or the first control is drawn according to an existing procedure. In this way, a process of generating the image and/or a process of drawing the first control according to the existing procedure may be concurrently performed. In this way, the generated image may be applied to a process of drawing the first control next time. In addition, the foregoing two processes are concurrently performed, so that efficiency of generating the image and/or drawing the first control can be improved.

In some embodiments, if a state of the first control is a first state, it is determined that the first control and the child control in the first control are not updated; or if a state of the first control is a second state, it is determined that the first control or the child control in the first control is updated.

In the foregoing process, whether the first control or the child control in the first control is updated may be simply and quickly determined based on the state of the first control.

In some embodiments, after it is detected that the first control or the child control in the first control is updated, the state of the first control is set to the second state. After the image corresponding to the first control is generated, the state of the first control is set to the first state.

In the foregoing process, the state of the first control is correspondingly set under a corresponding condition, so that whether the first control or the child control in the first control is updated can be accurately determined based on the state of the first control.

In some embodiments, the first control is a viewgroup control, and the child control in the first control is a view control.

An embodiment (sometimes referred to as, "a second aspect") of this application provides a page drawing control apparatus, including an obtaining module and a drawing module.

The obtaining module is configured to obtain a drawing instruction for a first page, where the drawing instruction is used to instruct to draw the first page, the first page includes a first control, and/or the first control includes at least one child control.

The drawing module is configured to: if it is determined that an image corresponding to the first control exists and/or the first control and the child control in the first control are not updated, draw the first control based on the image corresponding to the first control.

The drawing module is further configured to: if it is determined that an image corresponding to the first control does not exist or the first control or the child control in the first control is updated, generate the image corresponding to the first control and draw the first control.

In some embodiments, the drawing module is specifically configured to:
generate an image drawing command corresponding to the image;
update a drawing command in a display list of the first control to the image drawing command; and
draw the first control based on an updated display list of the first control.

In some embodiments, the drawing module is specifically configured to:
obtain attribute information of the first control, where the attribute information includes a size of the first control, a size of each child control in the first control, and/or a location of each child control in the first control; and
obtain, based on the attribute information and a preset draw function, the image corresponding to the first control.

In some embodiments, the drawing module is specifically configured to:

generate the image corresponding to the first control, and/or draw the first control based on the generated image corresponding to the first control.

In some embodiments, the drawing module is specifically configured to:
generate the image corresponding to the first control;
obtain the display list of the first control, where the display list includes a drawing command for the first control and/or a drawing command for each child control in the first control; and
draw the first control based on the display list.

In some embodiments, the apparatus further includes a determining module. The determining module is configured to:
if a state of the first control is a first state, determine that the first control and the child control in the first control are not updated, or
if a state of the first control is a second state, determine that the first control or the child control in the first control is updated.

In some embodiments, the apparatus further includes a setting module.

The setting module is configured to: after it is detected that the first control or the child control in the first control is updated, set the state of the first control to the second state.

The setting module is further configured to: after the drawing module generates the image corresponding to the first control, set the state of the first control to the first state.

In some embodiments, the first control is a viewgroup control, and the child control in the first control is a view control.

An embodiment (sometimes referred to as, "a third aspect") of this application provides an electronic device, including a memory and a processor. The processor executes program instructions in the memory, so that the electronic device is enabled to perform (e.g., execute, implement) the following steps:
obtaining a drawing instruction for a first page, where the drawing instruction is used to instruct to draw the first page, the first page includes a first control, and the first control includes at least one child control; and/or
if it is determined that an image corresponding to the first control exists and the first control and the child control in the first control are not updated, drawing the first control based on the image corresponding to the first control, or
if it is determined that an image corresponding to the first control does not exist or the first control or the child control in the first control is updated, generating the image corresponding to the first control and drawing the first control.

In some embodiments, the processor is specifically configured to:
generate an image drawing command corresponding to the image;
update a drawing command in a display list of the first control to the image drawing command; and
draw the first control based on an updated display list of the first control.

In some embodiments, the processor is specifically configured to:
obtain attribute information of the first control, where the attribute information includes a size of the first control, a size of each child control in the first control, and/or a location of each child control in the first control; and/or obtain, based on the attribute information and a preset draw function, the image corresponding to the first control.

In some embodiments, the processor is specifically configured to:

generate the image corresponding to the first control, and/or draw the first control based on the generated image corresponding to the first control.

In some embodiments, the processor is specifically configured to:

generate the image corresponding to the first control;

obtain the display list of the first control, where the display list includes a drawing command for the first control and/or a drawing command for each child control in the first control; and draw the first control based on the display list.

In some embodiments, the processor is specifically configured to:

if a state of the first control is a first state, determine that the first control and the child control in the first control are not updated, or if a state of the first control is a second state, determine that the first control or the child control in the first control is updated.

In some embodiments, the processor is further configured to:

after detecting that the first control or the child control in the first control is updated, set the state of the first control to the second state, and/or set the state of the first control to the first state.

In some embodiments, the first control is a viewgroup control, and/or the child control in the first control is a view control.

An embodiment (sometimes referred to as, "a fourth aspect") of this application provides a storage medium. The storage medium is configured to store a computer program. When being executed by a computer or a processor, the computer program is used to implement the page drawing control method according to any one of the first aspect.

An embodiment (sometimes referred to as, "a fifth aspect") of this application provides a computer program product. The computer program product includes instructions, and when the instructions are executed, a computer is enabled to perform the page drawing control method according to any one of the first aspect.

An embodiment (sometimes referred to as, "a sixth aspect") of this application provides a system-on-a-chip or a system chip. The system-on-a-chip or the system chip may be applied to an electronic device, and the system-on-a-chip or the system chip includes at least one communications interface, at least one processor, and at least one memory. The communications interface, the memory, and the processor are interconnected through a bus. The processor executes instructions stored in the memory, so that the electronic device is enabled to perform the page drawing control method according to any one of the first aspect of this application.

According to the page drawing control method, apparatus, and device provided in the embodiments of this application, in a page drawing process, for a viewgroup control on a page, an image of the viewgroup control may be first generated and stored. The image includes an image corresponding to the viewgroup control and an image corresponding to each child control in the viewgroup control. In this way, in the page drawing process, if content in a viewgroup control does not change and an image of the viewgroup control exists, the viewgroup control may be drawn based on the image, to reduce drawn content on the page, so as to improve drawing efficiency.

BRIEF DESCRIPTION OF DRAWINGS

FIG. 5A and FIG. 5B are a schematic diagram of a tree structure including a drawing command according to an embodiment of this application;

DESCRIPTION OF EMBODIMENTS

For ease of understanding, an architecture of a page is first described with reference to FIG. 1A.

Figure 1A:
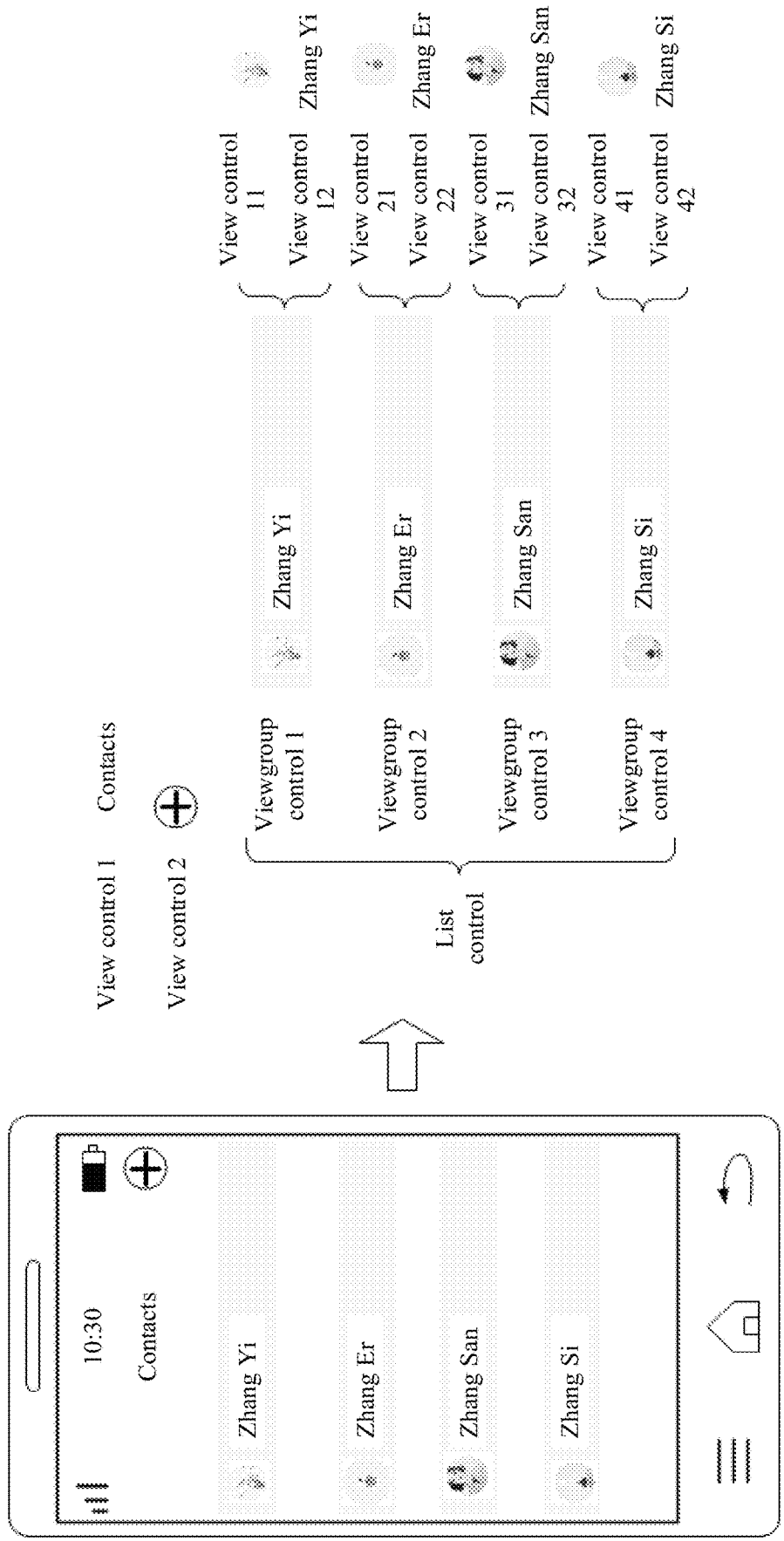
FIG. 1A is a schematic diagram of an architecture of a page according to an embodiment of this application.

FIG. 1A is a schematic diagram of an architecture of a page according to an embodiment of this application. The page may usually include two types of controls: a view control and a viewgroup control. The viewgroup control includes at least one view control. A viewgroup control may further include another viewgroup control, and the control included in the viewgroup control may alternatively be referred to as a child control of the viewgroup control. For example, refer to FIG. 1A. The page includes a view control 1, a view control 2, and a list control, and the list control is a viewgroup control. The list control includes a viewgroup control 1, a viewgroup control 2, a viewgroup control 3, and a viewgroup control 4. The viewgroup control 1, the viewgroup control 2, the viewgroup control 3, and the viewgroup control 4 each include two view controls.

Figure 1B:
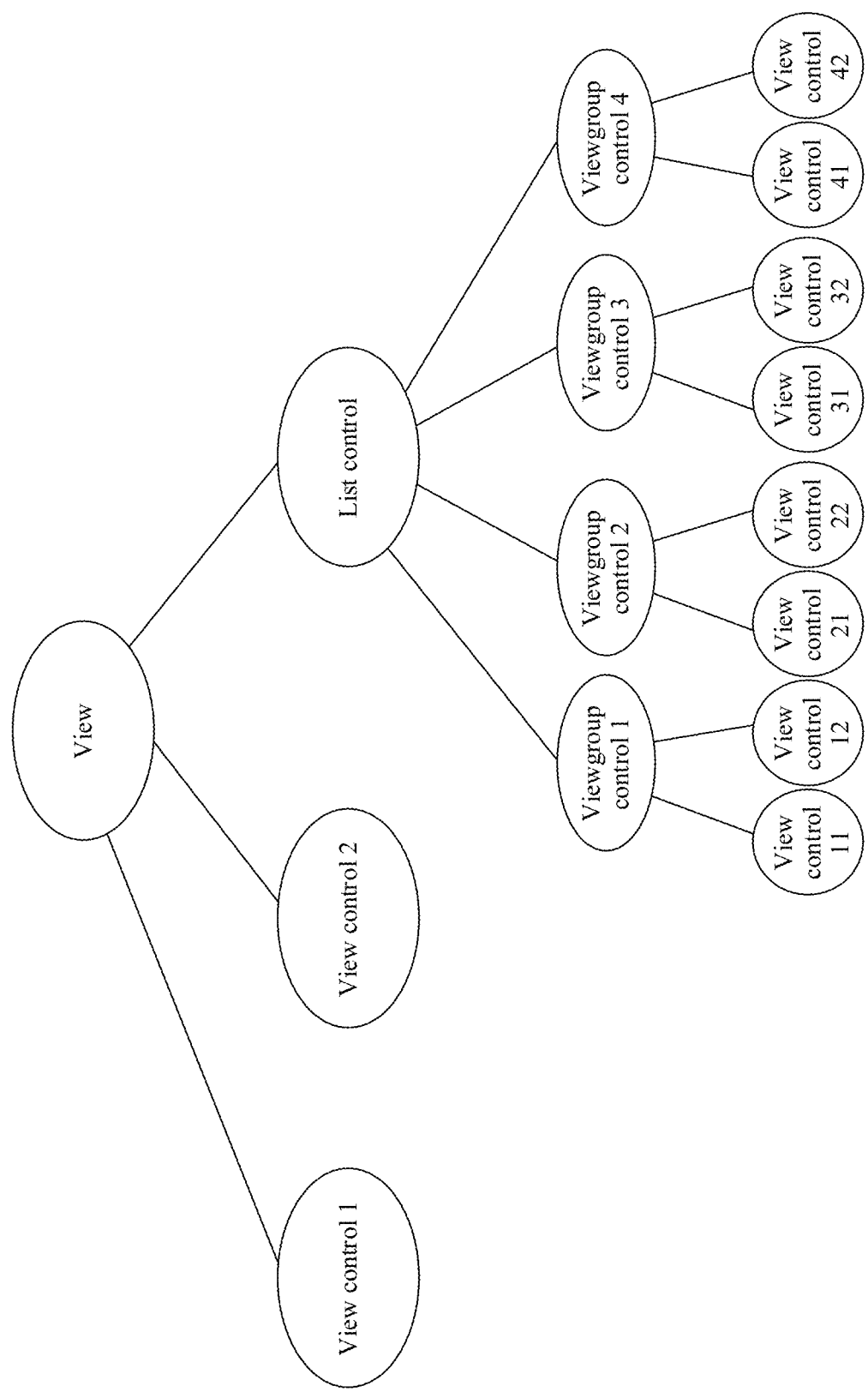
FIG. 1B is a schematic diagram of a tree structure including a control according to an embodiment of this application.

In some embodiments, the controls on the page may be represented in a tree structure. For example, the tree structure including the controls on the page shown in FIG. 1A may be shown in FIG. 1B. FIG. 1B is a schematic diagram of the tree structure including the controls according to this embodiment of this application. Refer to FIG. 1B. A root node (e.g., view) is a decorView control, and the control is a viewgroup control. The schematic diagram of the tree structure shown in FIG. 1B shows the controls included on the page shown in FIG. 1A and a relationship between the controls.

It should be noted that FIG. 1A is merely an example of a page. Certainly, the page may further include another control. This is not specifically limited in this embodiment of this application.

Figure 2:
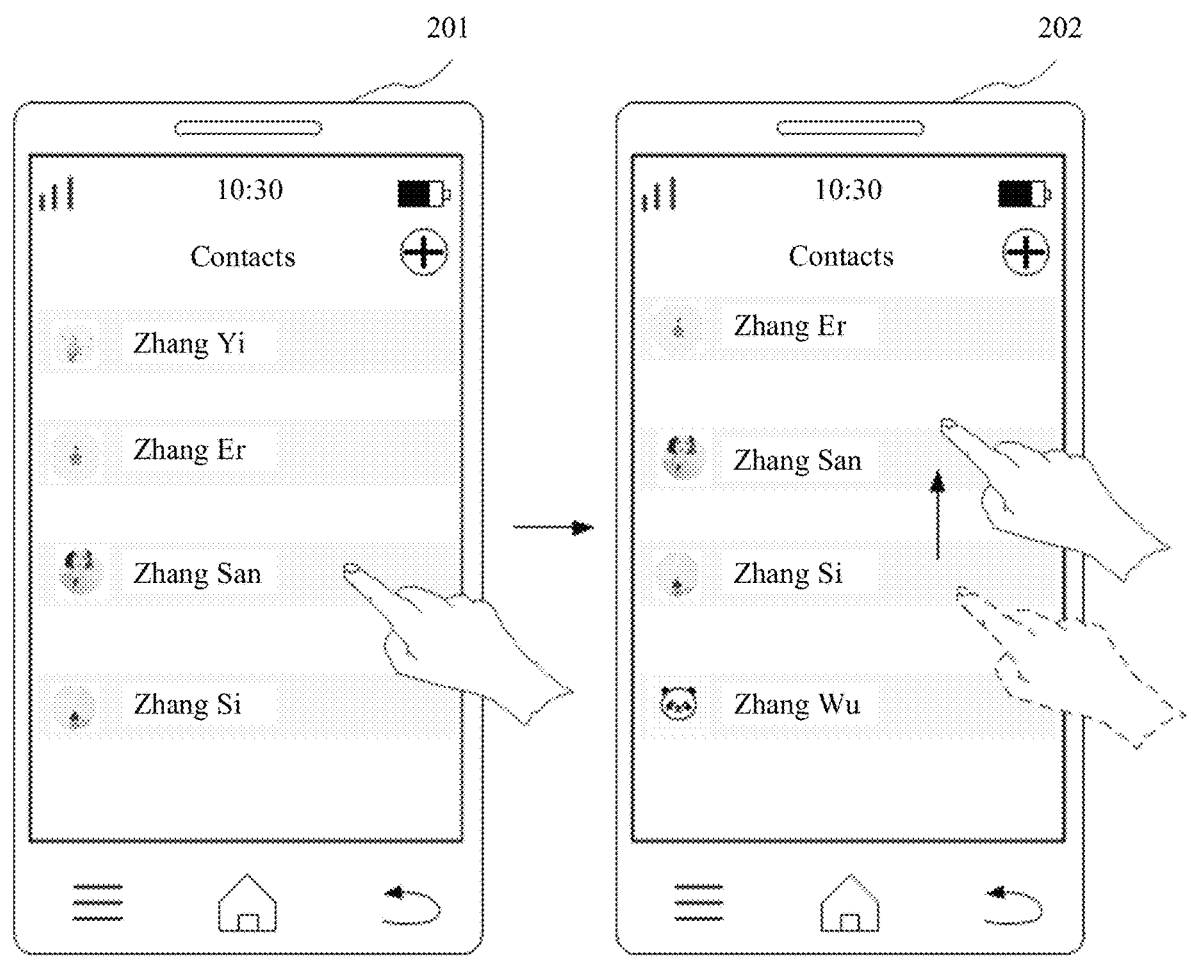
FIG. 2 is a schematic diagram of an application scenario according to an embodiment of this application.

With reference to FIG. 2, the following describes a scenario to which the embodiments of this application are applicable.

FIG. 2 is a schematic diagram of an application scenario according to an embodiment of this application. Refer to FIG. 2. A page 201 and a page 202 are included.

Refer to the page 201. An electronic device displays some contact information in "contacts". A user may flick up a screen, so that the electronic device displays other contact information.

Refer to the page 202. After the user flicks up the screen, the electronic device updates the displayed contact information. Compared with the page 201, the page 202 on the electronic device does not display information about a contact "Zhang Yi", but displays information about a contact "Zhang Wu", and information about contacts "Zhang Er", "Zhang San", and "Zhang Si" remains unchanged.

In a process in which the user flicks the screen, the electronic device periodically draws a displayed page. For example, the displayed page may be drawn once every 16 milliseconds, so that in the process in which the user flicks the screen, the page displayed by the electronic device can be smoothly flicked. In other words, a method shown in this application is applicable to a scenario in which the page is drawn in the process in which the user flicks the screen.

Certainly, the method shown in this application is further applicable to another scenario. For example, in a process in which the electronic device displays a page, content on the page may be automatically updated. After the content on the page is updated, the electronic device also redraws the displayed page. For example, a contact profile picture in "contacts" may be periodically updated. After detecting that the contact profile picture is updated, the electronic device may redraw the displayed page.

Figure 3:
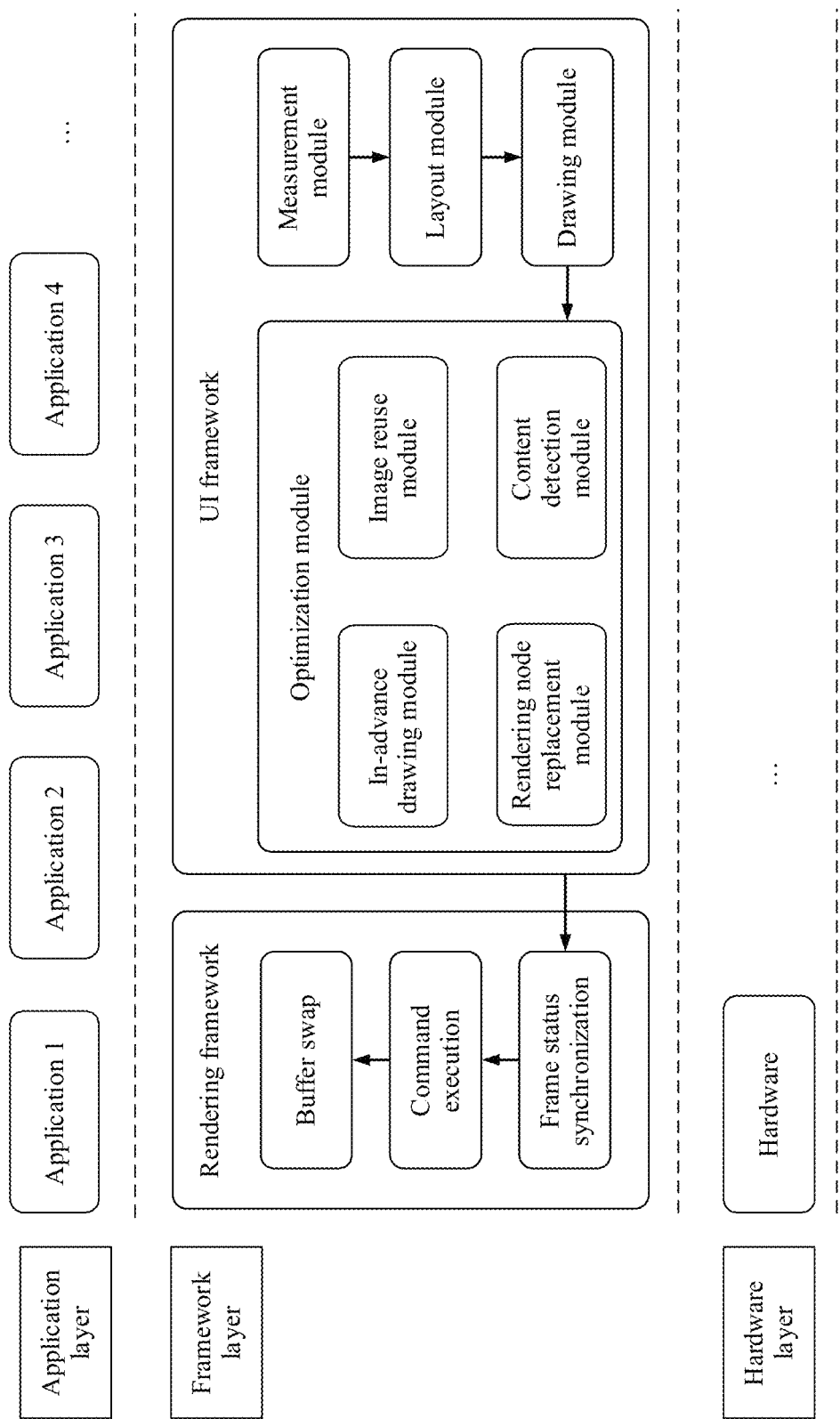
FIG. 3 is a schematic diagram of a structure of a system architecture of an electronic device according to an embodiment of this application.

The following describes a system architecture of an electronic device in this application with reference to FIG. 3.

FIG. 3 is a schematic diagram of a structure of a system architecture of an electronic device according to an embodiment of this application. Refer to FIG. 3. The system architecture of the electronic device includes an application layer, a framework layer, and a hardware layer.

The application layer includes a plurality of applications. For example, the application layer may include a communications application, a browser application, and the like.

The framework layer includes a user interface (UI) framework and a rendering framework. The UI framework includes a measurement module, a layout module, a drawing module, and an optimization module. The optimization module includes an in-advance drawing module, an image reuse module, a rendering node replacement module, and a content detection module. The measurement module is configured to measure a control to obtain a size of the control. The layout module is configured to lay out the control to obtain a location of the control. The drawing module is configured to obtain a display list of the control, and the display list includes a drawing command for the control. The in-advance drawing module is configured to draw an image corresponding to the control in advance. The content detection module is configured to detect whether content in the control changes. The image reuse module is configured to draw the control by using the image that is drawn in advance and that corresponds to the control. The rendering node replacement module is configured to replace a drawing instruction in the display list of the control with an image drawing instruction for the image corresponding to the control. The UI framework may send (e.g., provide, transmit, deliver) an updated display list to the rendering framework, and the rendering framework executes the drawing instruction in the display list, to draw the control.

The hardware layer includes a hardware structure. For example, the hardware layer may include hardware structures such as a central processing unit (CPU), a graphics processing unit (GPU), a storage unit, and a processing circuit.

Figure 4:
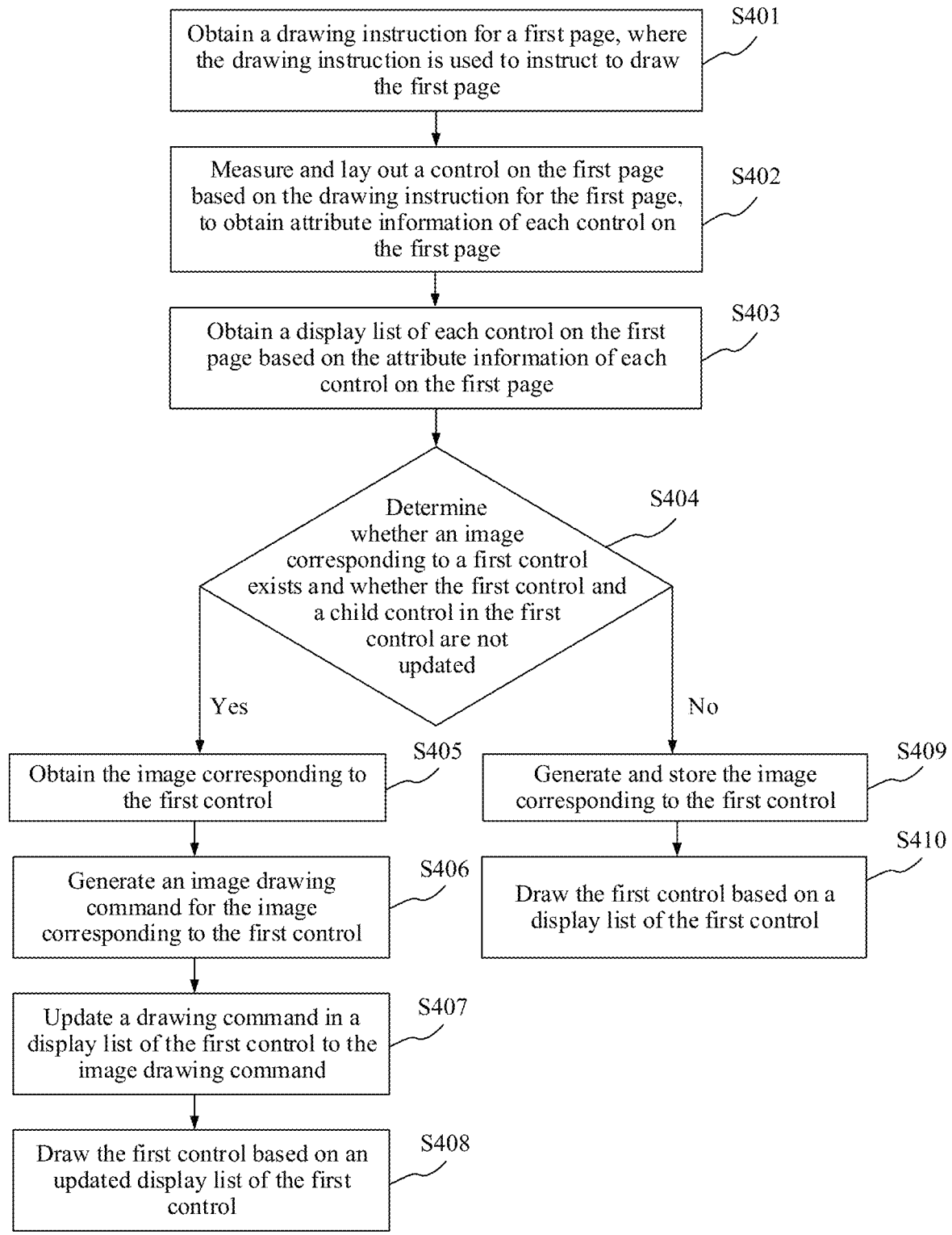
FIG. 4 is a schematic flowchart of a page drawing control method according to an embodiment of this application.

It should be noted that, in the embodiment shown in FIG. 4, functions of the modules in the system architecture are described in detail, and details are not described herein again.

In this application, in a page drawing process, for a viewgroup control on a page, an image of the viewgroup control may be first generated and stored. The image includes an image corresponding to the viewgroup control and an image corresponding to each child control in the viewgroup control. In this way, in the page drawing process, if content in a viewgroup control does not change and an image of the viewgroup control exists, the viewgroup control may be drawn based on the image, to reduce drawn content on the page, so as to improve drawing efficiency.

The following describes in detail the technical solutions in this application with reference to specific embodiments. It should be noted that the following several specific embodiments may be independent or may be combined with each other, and same or similar content is not described repeatedly in different embodiments.

FIG. 4 is a schematic flowchart of a page drawing control method according to an embodiment of this application. Refer to FIG. 4. The method may include the following steps.

S401: Obtain a drawing instruction for a first page, where the drawing instruction is used to instruct to draw the first page.

This embodiment of this application may be performed by an electronic device or a page drawing apparatus disposed in/outside an electronic device. In some embodiments, the electronic device may be a device such as a mobile phone, a computer, a wearable device, a virtual reality (VR) device, or an augmented reality (AR) device. The page drawing apparatus may be implemented by using software, or may be implemented by using a combination of software and hardware.

In some embodiments, the drawing instruction may be a vertical synchronization (Vsync) signal.

In some embodiments, the drawing instruction for the first page may be obtained in the following feasible implementation manners.

In some embodiments, in a process in which the electronic device displays the first page, a user inputs an operation on the first page, for example, a flicking operation or a tapping operation. After detecting the operation input by the user, the electronic device generates the drawing instruction for the first page. In some embodiments, in the process in which the user inputs the operation on the first page (that is, in a process in which the electronic device detects the operation input by the user), the electronic device periodically generates the drawing instruction, for example, generates the drawing instruction once every 16 milliseconds.

In some embodiments, the user operates the first page, so that the electronic device obtains the drawing instruction for the first page.

In some embodiments, in a process in which the electronic device displays the first page, the electronic device may monitor content in each control on the first page. When the electronic device detects that the content in the control on the first page changes, the electronic device obtains the drawing instruction for the first page. For example, refer to FIG. 1. In a process in which the electronic device displays the page shown in FIG. 1, when an image of the contact "Zhang Yi" changes, the electronic device obtains the drawing instruction for the first page.

In some embodiments, because the content in the control on the first page changes, the electronic device obtains the drawing instruction for the first page.

In some embodiments, when displaying another page other than the first page, the electronic device receives (e.g., retrieves, obtains, acquires) a display operation for the first page that is input by a user on the another page, so that the electronic device generates the drawing instruction for the first page. For example, the user may input a tapping operation on a control that is on the another page and that is used to go to the first page, so that the electronic device generates the drawing instruction for the first page. For example, when the another page is displayed, the user may input a preset split-screen gesture, so that the first page is displayed on a current display interface in split-screen mode. The electronic device generates the drawing instruction for the first page in response to the preset split-screen gesture.

In some embodiments, the user operates the another page other than the first page, so that the electronic device obtains the drawing instruction for the first page.

S402: Measure and lay out the control on the first page based on the drawing instruction for the first page, to obtain attribute information of each control on the first page.

In some embodiments, when a control is a view control, attribute information of the view control includes a size and a location of the view control. When a control is a viewgroup control, attribute information of the viewgroup control includes a size of the viewgroup control, a location of the viewgroup control, a size of each child control in the viewgroup control, and a location of each child control in the viewgroup control.

In some embodiments, the size of the control can be obtained by measuring (e.g., determining, calculating, estimating) the control. For example, when a control is a view control, the view control may be measured by using a measure function, to obtain a size of the view control. When a control is a viewgroup control, the viewgroup control and each child control included in the viewgroup control may be separately measured by using the measure function, to obtain a size of the viewgroup control and a size of each child control in the viewgroup control. In other words, after a viewgroup control is measured, a size of the viewgroup control may be obtained, and a size of each child control in the viewgroup control may further be obtained. In some embodiments, the size of the control may be obtained by using the measurement module in FIG. 3.

In some embodiments, a location of the control can be obtained by laying out the control. For example, when a control is a view control, the view control may be laid out by using a layout function, to obtain a location of the view control. When a control is a viewgroup control, the viewgroup control and each child control included in the viewgroup control may be separately laid out by using the layout function, to obtain a location of the viewgroup control and a location of each child control in the viewgroup control. In other words, after a viewgroup control is laid out, a location of the viewgroup control may be obtained, and a location of each child control in the viewgroup control may further be obtained. In some embodiments, the location of the control may be obtained by using the layout module in FIG. 3.

S403: Obtain a display list of each control on the first page based on the attribute information of each control on the first page.

A display list of a control includes a drawing instruction corresponding to the control.

When a control is a view control, a drawing instruction corresponding to the view control includes a drawing instruction for the view control. In other words, a display list of the view control includes one drawing instruction.

When a control is a viewgroup control, a drawing instruction corresponding to the viewgroup control includes a drawing instruction for the viewgroup control and a drawing instruction for each child control in the viewgroup control. In other words, a display list of the viewgroup control includes at least two drawing instructions.

A process of obtaining the display list of each control on the first page is the same. For any control on the first page, a display list of the control may be obtained based on attribute information of the control and a draw function. In some embodiments, a drawing command in the display list may be displayed in a tree structure. The following describes the drawing command in the tree structure with reference to FIG. 5A and FIG. 5B.

Figure 5B:
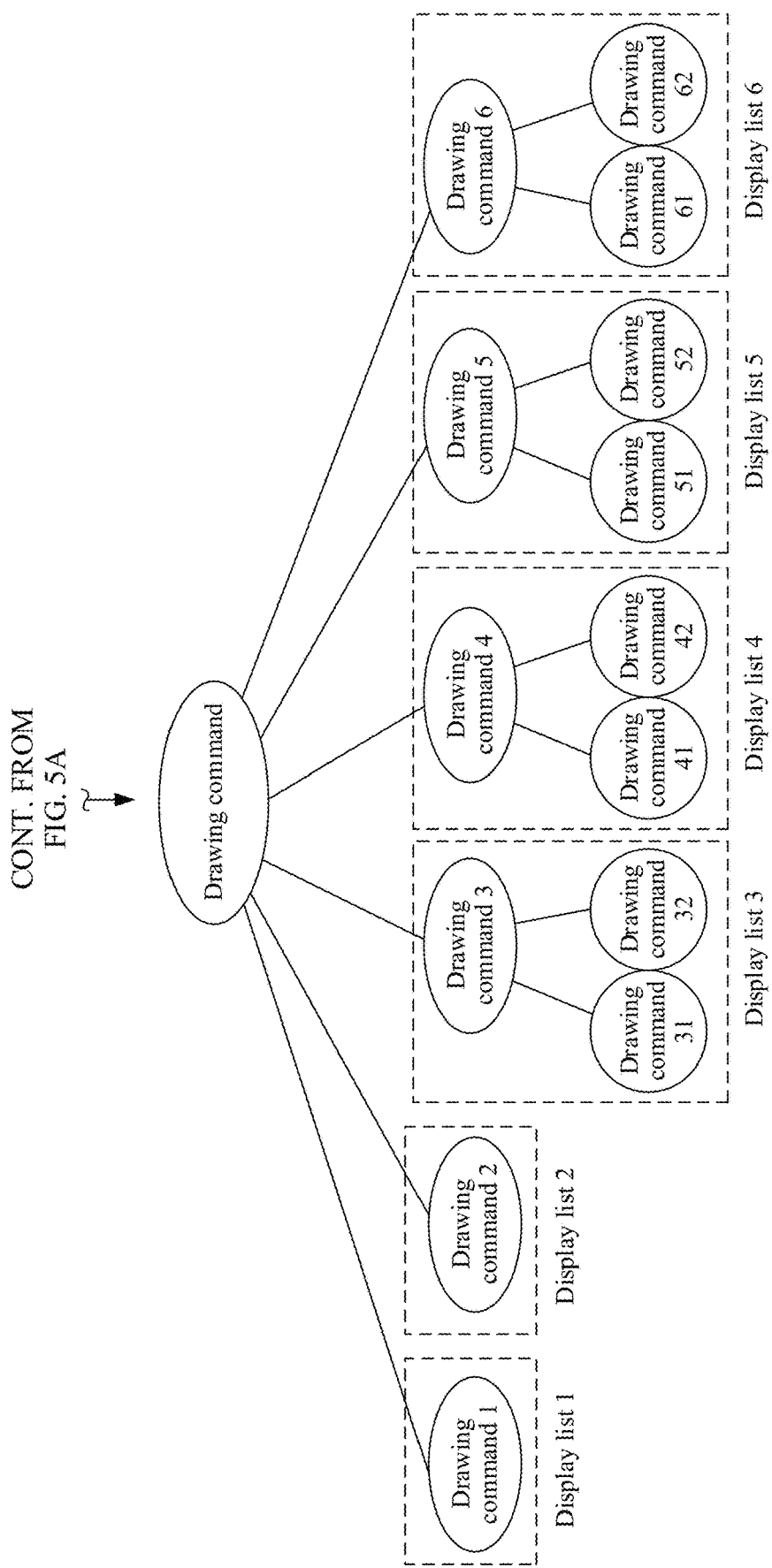

FIG. 5A and FIG. 5B are a schematic diagram of a tree structure including a drawing command according to an embodiment of this application. FIG. 5A and FIG. 5B show a tree structure including a control and a tree structure that includes a drawing command and that corresponds to the tree structure including the control. Refer to FIG. 5A and FIG. 5B. There is a correspondence between the tree structure including the control and the tree structure including the drawing command. A correspondence between a control and a display list is shown in Table 1.

TABLE 1

| Control | Display list |
| --- | --- |
| View control 1 | Display list 1 |
| View control 2 | Display list 2 |
| Viewgroup control 1 | Display list 3 |
| Viewgroup control 2 | Display list 4 |

TABLE 1-continued

| Control | Display list |
|---|---|
| Viewgroup control 3 | Display list 5 |
| Viewgroup control 4 | Display list 6 |

In some embodiments, the display list of each control on the first page may be obtained by using the drawing module in FIG. 3.

After S403, each control is separately drawn. The following describes a drawing process of any first control on the first page. The first control is a viewgroup control, and the first control includes at least one child control.

S404: Determine whether an image corresponding to the first control exists and whether the first control and the child control in the first control are not updated.

If yes, S405 to S408 are performed.

If no, S409 and S410 are performed.

In some embodiments, an image corresponding to a control may be stored in the following feasible implementation manner: obtaining an identifier of the control, and storing the identifier of the control and the image corresponding to the control in a form of a key-value (K-V) pair in a hash table. The identifier of the control may be a location keyword of the control, and the location keyword of the control is used to indicate a location of the control on a page. For example, the location keyword of the control may be a sequence number of the control in a listview. It is assumed that the listview includes 20 controls, and the 20 controls are sequentially arranged in the listview. In this case, location keywords of the 20 controls in the listview are respectively 1, 2, 3, . . . , 20. In some embodiments, when it is determined whether the image corresponding to the first control exists, an identifier of the first control may be obtained, and whether an image corresponding to the location keyword exists in the hash table is determined based on the identifier of the first control. Certainly, another existing storage method may alternatively be used, and a specific storage implementation is not limited in this embodiment of the present disclosure.

In some embodiments, whether the first control and the child control in the first control are updated may be determined in the following feasible implementation manner: obtaining a state of the first control, and if the state of the first control is a first state, determining that the first control and the child control in the first control are not updated, or if the state of the first control is a second state, it is determined that the first control or the child control in the first control is updated. In some embodiments, initially, the state of the first control may be the first state. When it is detected that the first control or the child control in the first control is updated, the state of the first control is set to the second state. After the image corresponding to the first control is generated, the state of the first control is set to the first state. In some embodiments, whether the first control and the child control in the first control are updated may be determined by determining whether a preset flag is a preset value. For example, the preset flag is set to 0 during initialization. The preset flag is set to 1 if the first control or any child control in the first control is updated, and is restored to 0 when a preset condition is met (for example, a preset time period expires, a preset message is received, or it is determined that a preset mode is entered, that is, after the control and the child control are displayed after the change, the preset flag is restored to 0). Whether the first control and the child control in the first control are updated can be determined by detecting whether the preset flag is 1. If the preset flag is 1, it is determined that the first control and the child control in the first control are updated. If the preset flag is 0, it is determined that the first control and the child control in the first control are not updated. In some embodiments, whether the first control and the child control in the first control are updated may be detected by using the content detection module in FIG. 3.

S405: Obtain the image corresponding to the first control.

In some embodiments, the image corresponding to the first control may be obtained from the hash table based on the identifier of the first control.

In some embodiments, the image corresponding to the first control may be obtained by using the image reuse module in FIG. 3.

S406: Generate an image drawing command for the image corresponding to the first control.

In some embodiments, the image drawing command may be generated by using the draw function.

S407: Update a drawing command in a display list of the first control to the image drawing command.

In some embodiments, the drawing command in the display list of the first control may be replaced with the image drawing command. To be specific, the drawing command in the display list of the first control is deleted, and the image drawing command is added to the display list of the first control.

Figure 6:
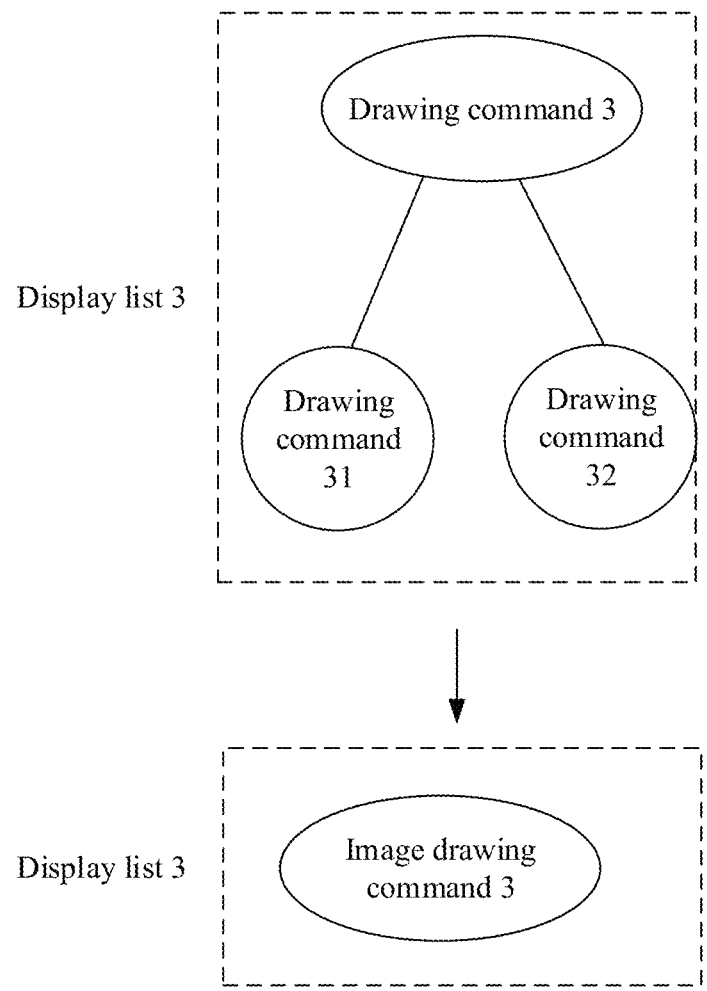
FIG. 6 is a schematic diagram of a display list according to an embodiment of this application.

The following describes the to-be-updated display list of the first control and an updated display list with reference to FIG. 6.

FIG. 6 is a schematic diagram of the display list according to this embodiment of this application. Refer to FIG. 6, FIG. 5A, and FIG. 5B. It is assumed that the first control is the viewgroup control 1 in FIG. 1. Before S407 is performed, a display list of the viewgroup control 1, namely, the display list 3, includes a drawing command 3, a drawing command 31, and a drawing command 32. After S407, the display list 3 includes an image drawing command 3.

In some embodiments, the display list of the first control may be updated by using the rendering node replacement module in FIG. 3.

S408: Draw the first control based on the updated display list of the first control.

In some embodiments, the drawing command in the display list of the first control may be executed to draw the first control. Because the drawing command in the display list of the first control is the image drawing command, the image drawing command may be executed to draw the first control based on the image corresponding to the first control. In the process of drawing the first control by using the image drawing command, a quantity of rendered pixels is a quantity of pixels in an area in which the image corresponding to the first control is located.

In some embodiments, the electronic device includes a UI thread and a render thread. A process of performing S401 to S407 may be performed by the UI thread. The UI thread may send the display list obtained in S407 to the render thread, so that the render thread performs step S408, that is, draws the first control based on the updated display list.

In some embodiments, the first control may be drawn by using the rendering framework in FIG. 3.

Figure 7:
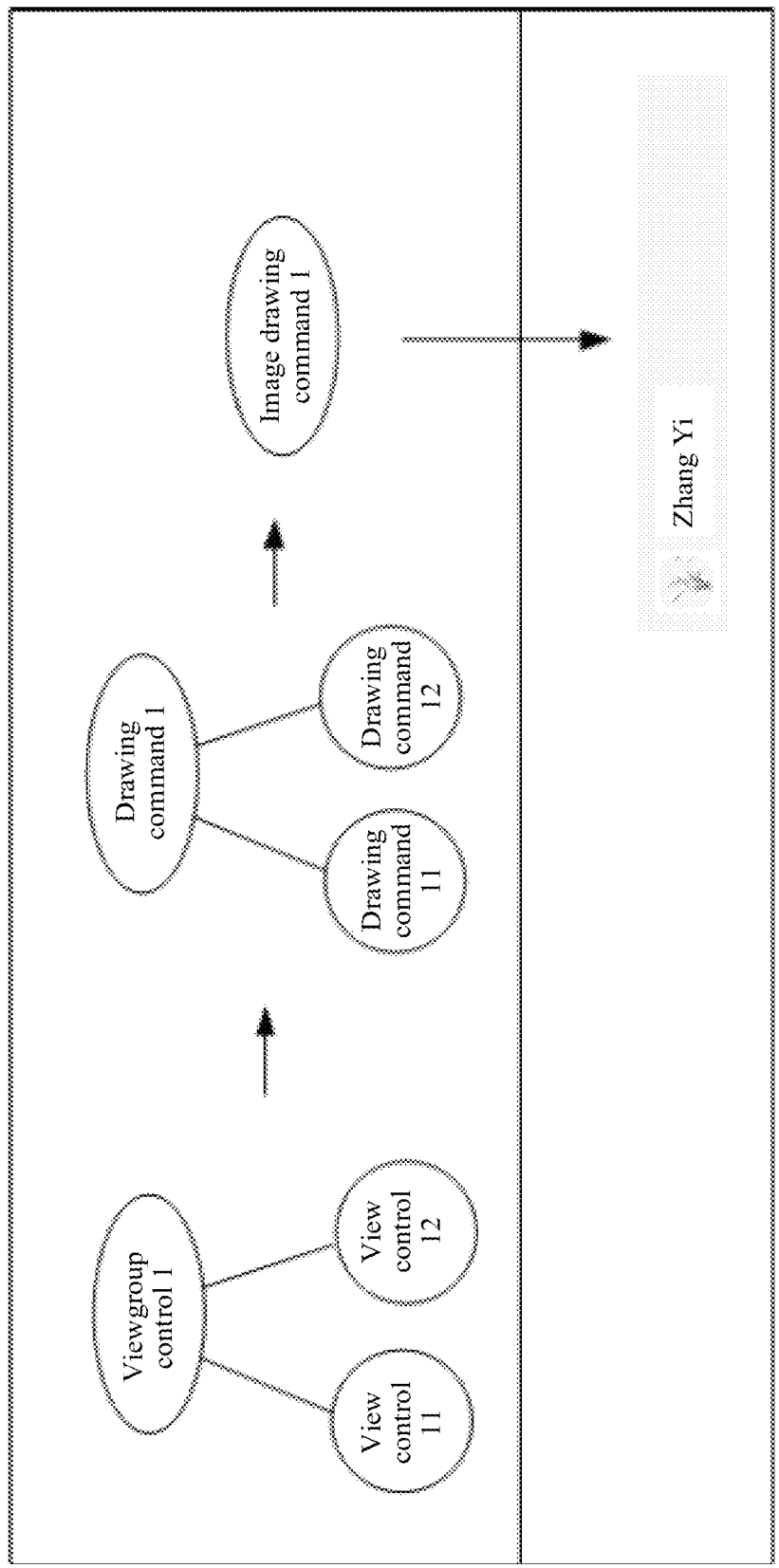
FIG. 7 is a schematic diagram of a control drawing process according to an embodiment of this application.

The following describes the drawing process of the first control with reference to FIG. 7.

FIG. 7 is a schematic diagram of a control drawing process according to an embodiment of this application. Refer to FIG. 7. It is assumed that the first control is the viewgroup control 1 in FIG. 1, and the viewgroup control 1 includes a view control 11 and a view control 12. After the viewgroup control 1 is measured, laid out, and drawn, a display list of the viewgroup control 1 may be obtained, and the display list includes a drawing command 1, a drawing command 11, and a drawing command 12. It is assumed that an image corresponding to the viewgroup control 1 exists, and the viewgroup control 1 and a child control in the viewgroup control 1 are not updated. In this case, the display list of the first control is updated, and the updated display list includes an image drawing command 1. When drawing is performed based on the display list, the image corresponding to the viewgroup control 1 is rendered based on the image drawing command 1, to obtain the viewgroup control 1. In a process of drawing the viewgroup control 1, a rendered pixel includes a pixel in the image corresponding to the viewgroup control 1. The pixel in the image corresponding to the viewgroup control 1 is equal to a pixel in a rectangular box in which the viewgroup control 1 is located, so that fewer pixels are rendered, to improve rendering efficiency.

S409: Generate and store the image corresponding to the first control.

In some embodiments, the image corresponding to the first control may be generated in the following feasible implementation manner: Attribute information of the first control may be obtained. The attribute information includes a size of the first control, a size of each child control in the first control, and a location of each child control in the first control. The image corresponding to the first control is obtained based on the attribute information and a preset draw function (for example, the foregoing draw function). For example, the first control may be drawn by using each child control in the first control, to obtain the image corresponding to the first control.

In some embodiments, the identifier of the first control may be obtained, and the identifier of the first control and the image corresponding to the first control may be stored in the form of the K-V pair in the hash table.

In some embodiments, the image corresponding to the first control may be generated by using the in-advance drawing module in FIG. 3.

S410: Draw the first control based on the display list of the first control.

Because the display list of the first control includes a drawing command for the first control and a drawing command for each child control in the first control, drawing may be sequentially performed based on the drawing command for the first control and the drawing command for each child control in the first control, to obtain the first control.

In some embodiments, a process of performing S409 may be performed by the UI thread. Because the display list of the first control does not need to be updated, the UI thread may send the display list obtained in S403 to the render thread, so that the render thread performs S410, that is, draws the first control based on the display list obtained in S403.

Figure 8:
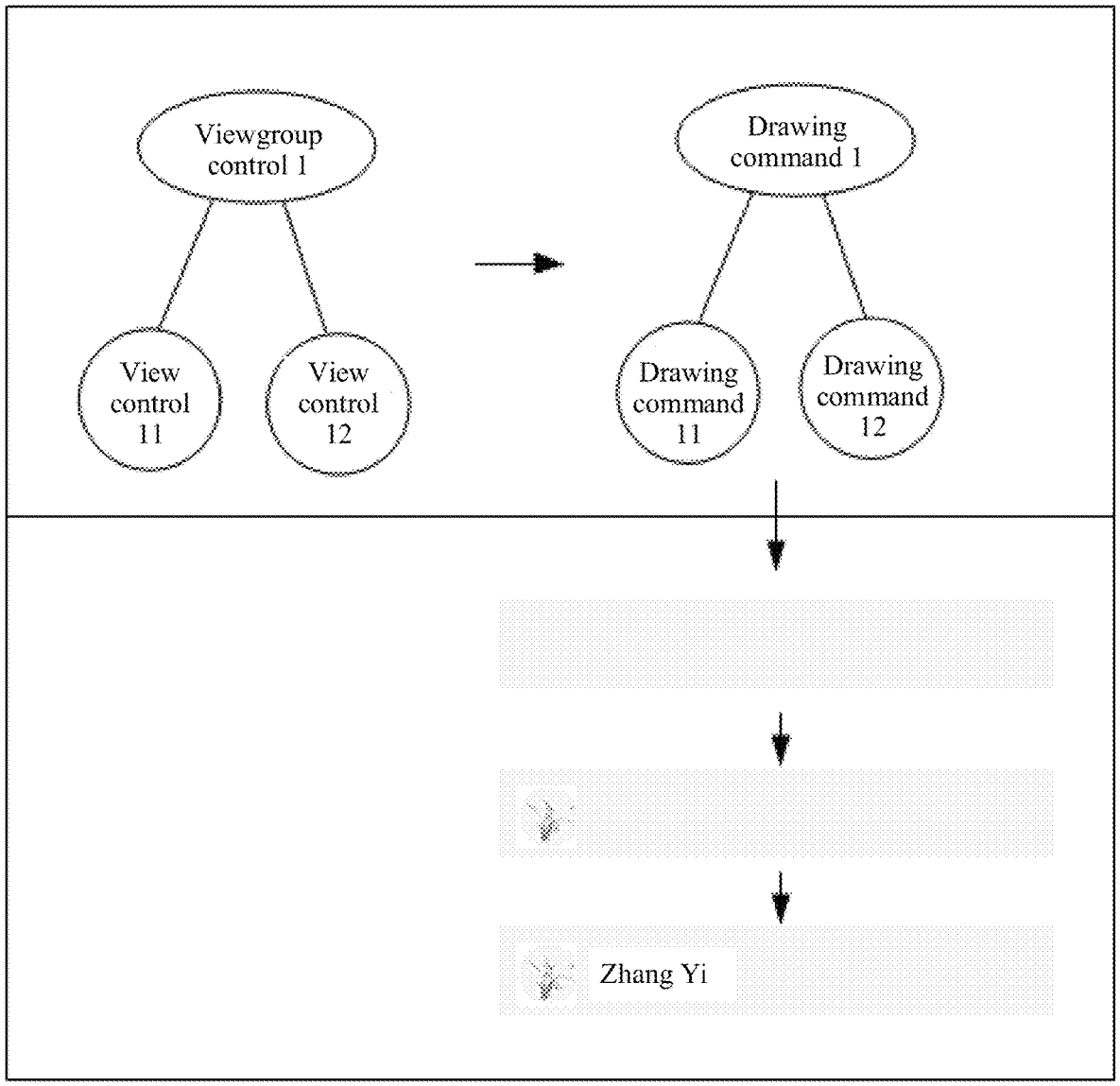
FIG. 8 is a schematic diagram of a control drawing process according to an embodiment of this application.

The following describes the drawing process of the first control with reference to FIG. 8.

FIG. 8 is a schematic diagram of a control drawing process according to an embodiment of this application. Refer to FIG. 8. It is assumed that the first control is the viewgroup control 1 in FIG. 1, and the viewgroup control 1 includes a view control 11 and a view control 12. After the viewgroup control 1 is measured, laid out, and drawn, a display list of the viewgroup control 1 may be obtained, and the display list includes a drawing command 1, a drawing command 11, and a drawing command 12. When drawing is performed based on the display list, a rectangular box corresponding to the viewgroup control 1 is first rendered based on the drawing command 1. Then, an image corresponding to the view control 11 is rendered in the rectangular box based on the drawing command 11, and a text "Zhang Yi" in the view control 12 is rendered in the rectangular box based on the drawing command 12. It can be learned from the foregoing that, in the process of drawing the viewgroup control 1, rendered pixels include a sum of all pixels in an area in which the rectangular box is located, all pixels in an area in which the image is located, and all pixels in an area in which the text is located. Because the pixel in the area in which the image is located and the pixel in the area in which the text is located both coincide with the pixel in the area in which the rectangular box is located, there are repeatedly rendered pixels (all the pixels in the area in which the image is located and in the area in which the text is located are repeatedly rendered) in the process of drawing the viewgroup control 1, resulting in relatively low rendering efficiency.

It should be noted that after S409, the first control may further be drawn based on the image corresponding to the first control. A process of drawing the first control based on the image corresponding to the first control is the same as a process of performing S406 to S408, and details are not described herein again.

It should be noted that step S410 may alternatively be performed before S409, or both S410 and S409 are simultaneously performed. In some embodiments, as described above, S410 is not performed, but S406 to S408 are performed after S409.

It should be noted that the processing steps (S401 to S410) shown in the embodiment in FIG. 4 do not constitute a specific limitation on a page drawing process. In some other embodiments of this application, the page drawing process may include more or fewer steps than those in the embodiment in FIG. 4. For example, the page drawing process may include some steps in the embodiment in FIG. 4. In some embodiments, some steps in the embodiment in FIG. 4 may be replaced with steps having same functions, or some steps in the embodiment in FIG. 4 may be split into a plurality of steps.

According to the page drawing method provided in the embodiment of this application, in a page drawing process, for a viewgroup control on a page, an image of the viewgroup control may be first generated and stored. The image includes an image corresponding to the viewgroup control and an image corresponding to each child control in the viewgroup control. In this way, in the page drawing process, if content in a viewgroup control does not change and an image of the viewgroup control exists, the viewgroup control may be drawn based on the image, to reduce drawn content on the page, so as to improve drawing efficiency.

Based on any one of the foregoing embodiments, with reference to FIG. 9A to FIG. 13B, the following describes the page drawing method by using specific examples.

Figure 9A:
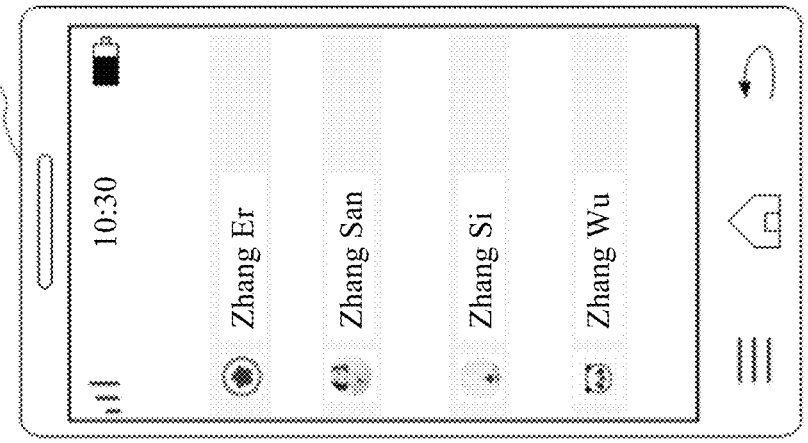
FIG. 9A and FIG. 9B are a schematic diagram of a page according to an embodiment of this application.
Figure 9A:
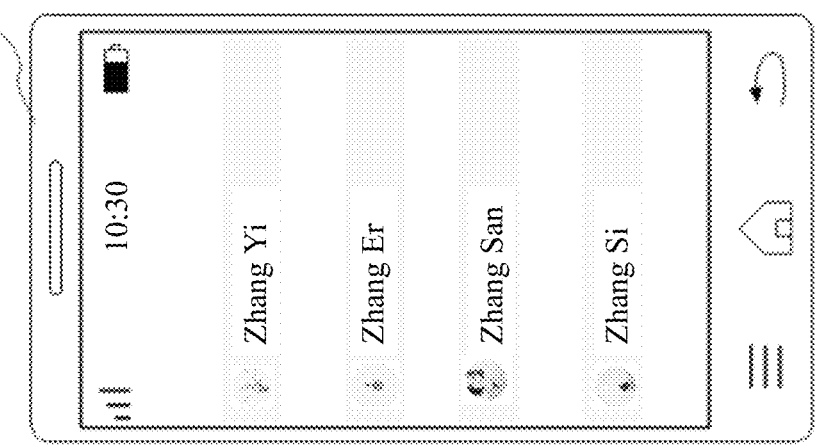
Figure 9A:
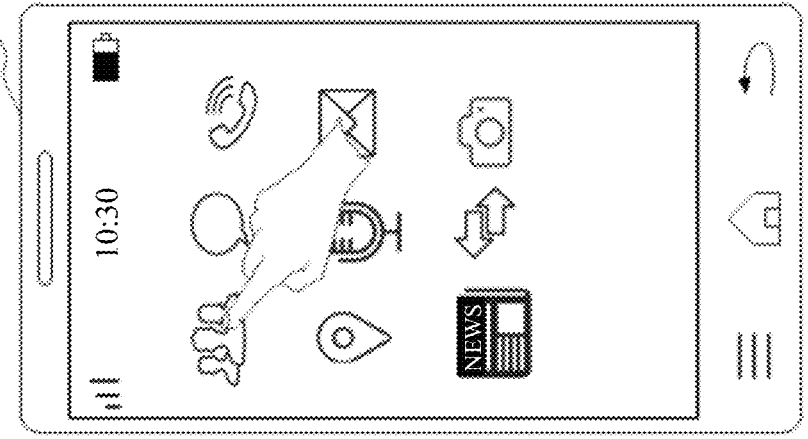
Figure 9B:
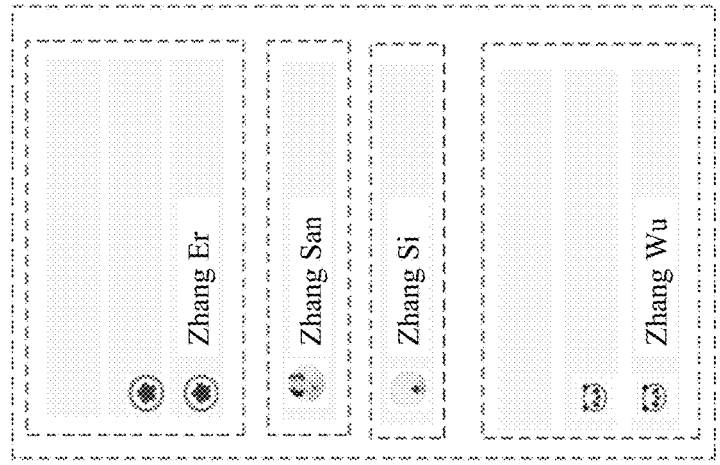
Figure 9B:
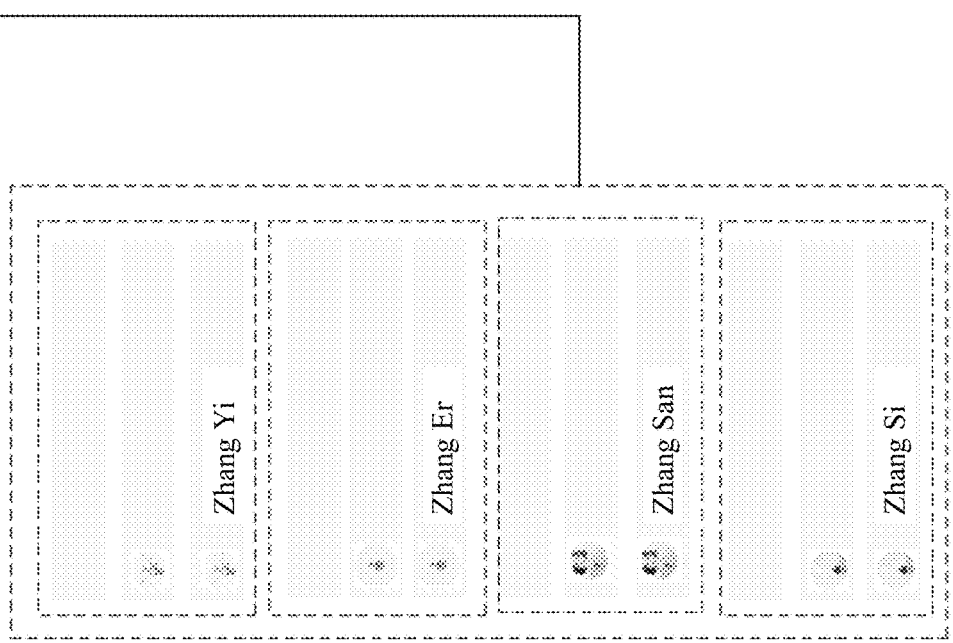

FIG. 9A and FIG. 9B are a schematic diagram of a page according to an embodiment of this application. Refer to FIG. 9A. A page 901, a page 902, and a page 903 are included.

Refer to the page 901. The page 901 includes icons of a plurality of applications. When the user needs to view a contact list, the user may perform a tapping operation on a contact list icon. In response to detecting the tapping operation on the contact list icon, the electronic device obtains a drawing instruction for a contact page.

The electronic device obtains, according to the drawing instruction, a control included on the to-be-displayed contact page. It is assumed that the to-be-displayed contact page includes a list control, the list control includes viewgroup controls corresponding to information about four contacts, and each viewgroup control includes an image control and a text control. In other words, a tree structure including the control that is included on the to-be-displayed contact page and that is obtained by the electronic device is shown in FIG. 10.

Figure 10:
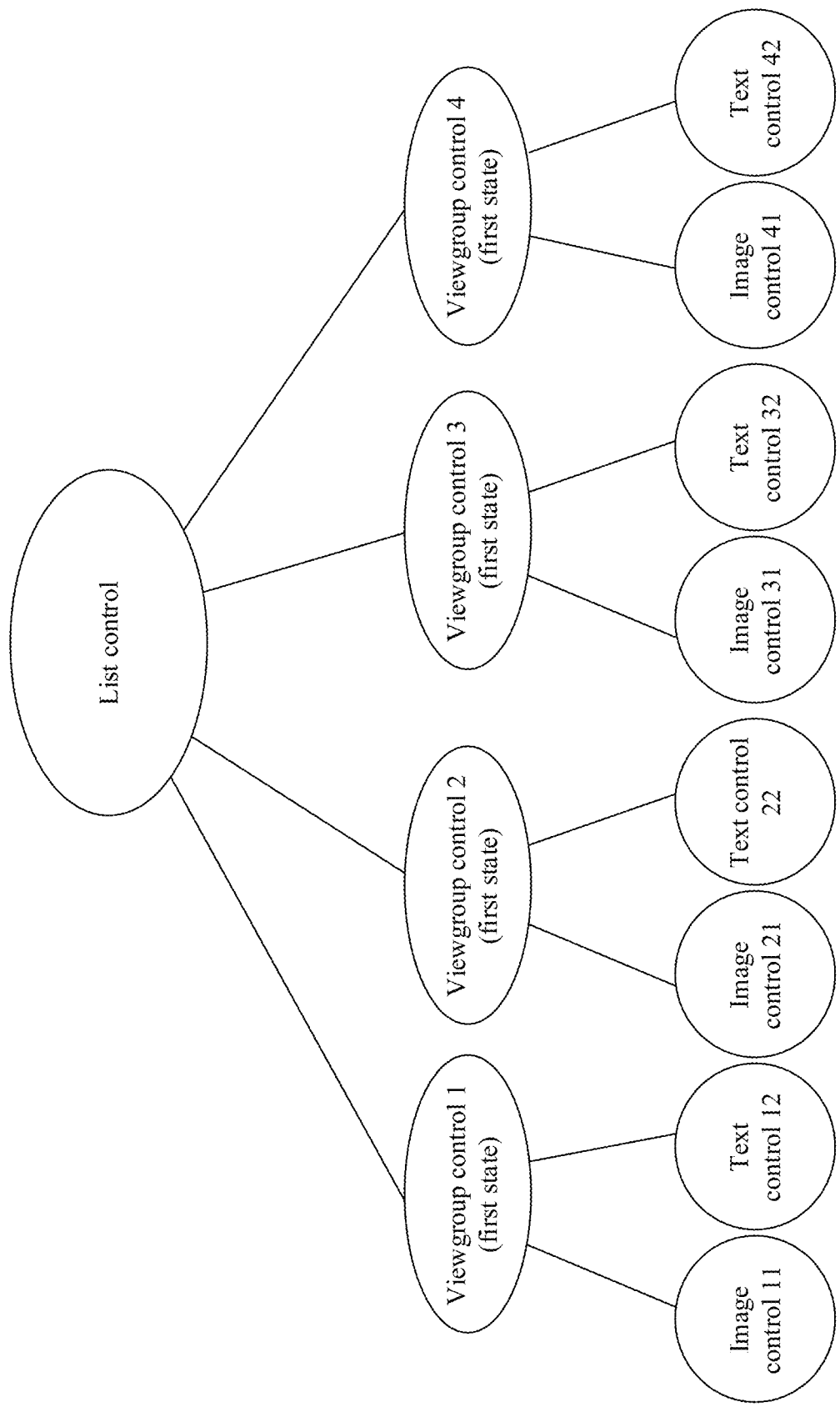
FIG. 10 is a schematic diagram of another tree structure including controls according to an embodiment of this application.

FIG. 10 is a schematic diagram of another tree structure including controls according to an embodiment of this application. Refer to FIG. 10. A correspondence between the information about four contacts on the contact page and the controls is shown in Table 2.

TABLE 2

| Contact | Control |
| --- | --- |
| Zhang Yi | Viewgroup control 1 (first state), image control 11, text control 12 |
| Zhang Er | Viewgroup control 2 (first state), image control 21, text control 22 |
| Zhang San | Viewgroup control 3 (first state), image control 31, text control 32 |
| Zhang Si | Viewgroup control 4 (first state), image control 41, text control 42 |

In the control shown in FIG. 10, states of the viewgroup control 1, the viewgroup control 2, the viewgroup control 3, and the viewgroup control 4 are all the first states.

The electronic device measures, lays out, and draws the control shown in FIG. 10 according to the drawing instruction, to obtain a display list of each control on the contact page. The display list may be shown in FIG. 11.

Figure 11:
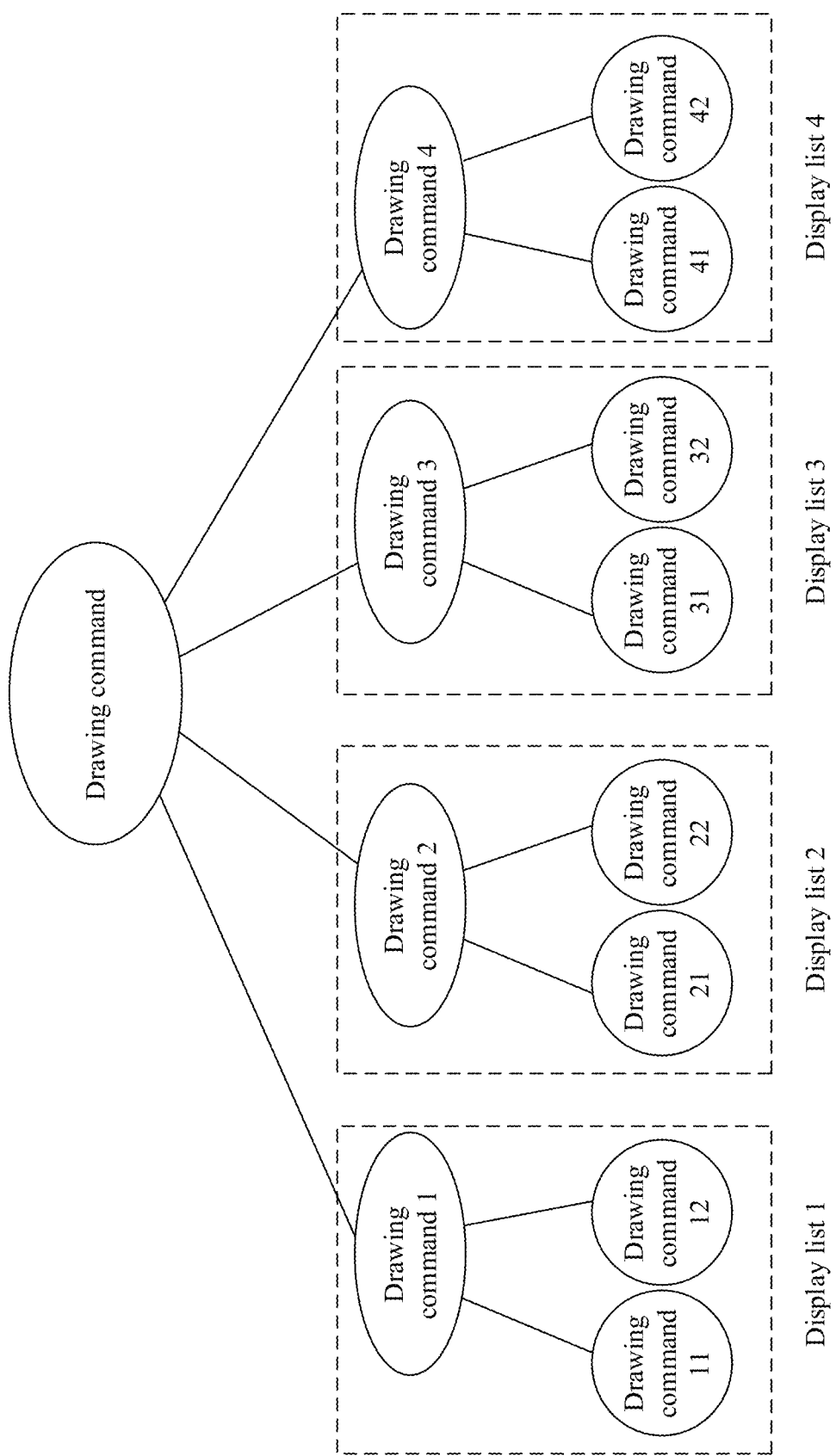
FIG. 11 is a schematic diagram of another tree structure including display lists according to an embodiment of this application.

FIG. 11 is a schematic diagram of another tree structure including display lists according to an embodiment of this application. Refer to FIG. 11. A correspondence between the information about four contacts on the contact page and the display lists is shown in Table 3.

TABLE 3

| Contact | Display list | Drawing command |
| --- | --- | --- |
| Zhang Yi | Display list 1 | Drawing command 1, drawing command 11, drawing command 12 |
| Zhang Er | Display list 2 | Drawing command 2, drawing command 21, drawing command 22 |
| Zhang San | Display list 3 | Drawing command 3, drawing command 31, drawing command 32 |
| Zhang Si | Display list 4 | Drawing command 4, drawing command 41, drawing command 42 |

The electronic device determines that images respectively corresponding to the viewgroup control 1, the viewgroup control 2, the viewgroup control 3, and the viewgroup control 4 do not exist. In this case, the electronic device separately generates and stores the images corresponding to the viewgroup control 1, the viewgroup control 2, the viewgroup control 3, and the viewgroup control 4.

Because the images respectively corresponding to the viewgroup control 1, the viewgroup control 2, the viewgroup control 3, and the viewgroup control 4 do not exist, the electronic device renders each control on the contact page based on the display list shown in FIG. 11. A rendering process is shown as a rendering process 1 in FIG. 9B. After the rendering shown in the rendering process 1 in FIG. 9B, the page 902 is obtained. Processes of drawing the controls may be sequentially performed, or may be concurrently performed.

Refer to the page 902. After the electronic device displays a contact list shown on the page 902, if the user needs to view information about another contact, the user may input a flicking-up operation on the electronic device. In the process in which the user inputs the flicking-up operation, the electronic device obtains a drawing instruction for a contact page.

The electronic device obtains, according to the drawing instruction, a control included on the to-be-displayed contact page. It is assumed that the to-be-displayed contact page includes a list control, the list control includes viewgroup controls corresponding to information about four contacts, and each viewgroup control includes an image control and a text control. It is assumed that the content detection module detects that a contact profile picture corresponding to the contact "Zhang Er" changes (compared with a last drawn contact profile picture corresponding to the "Zhang Er"). In this case, a tree structure including the control that is included on the to-be-displayed contact page and that is obtained by the electronic device is shown in FIG. 12.

Figure 12:
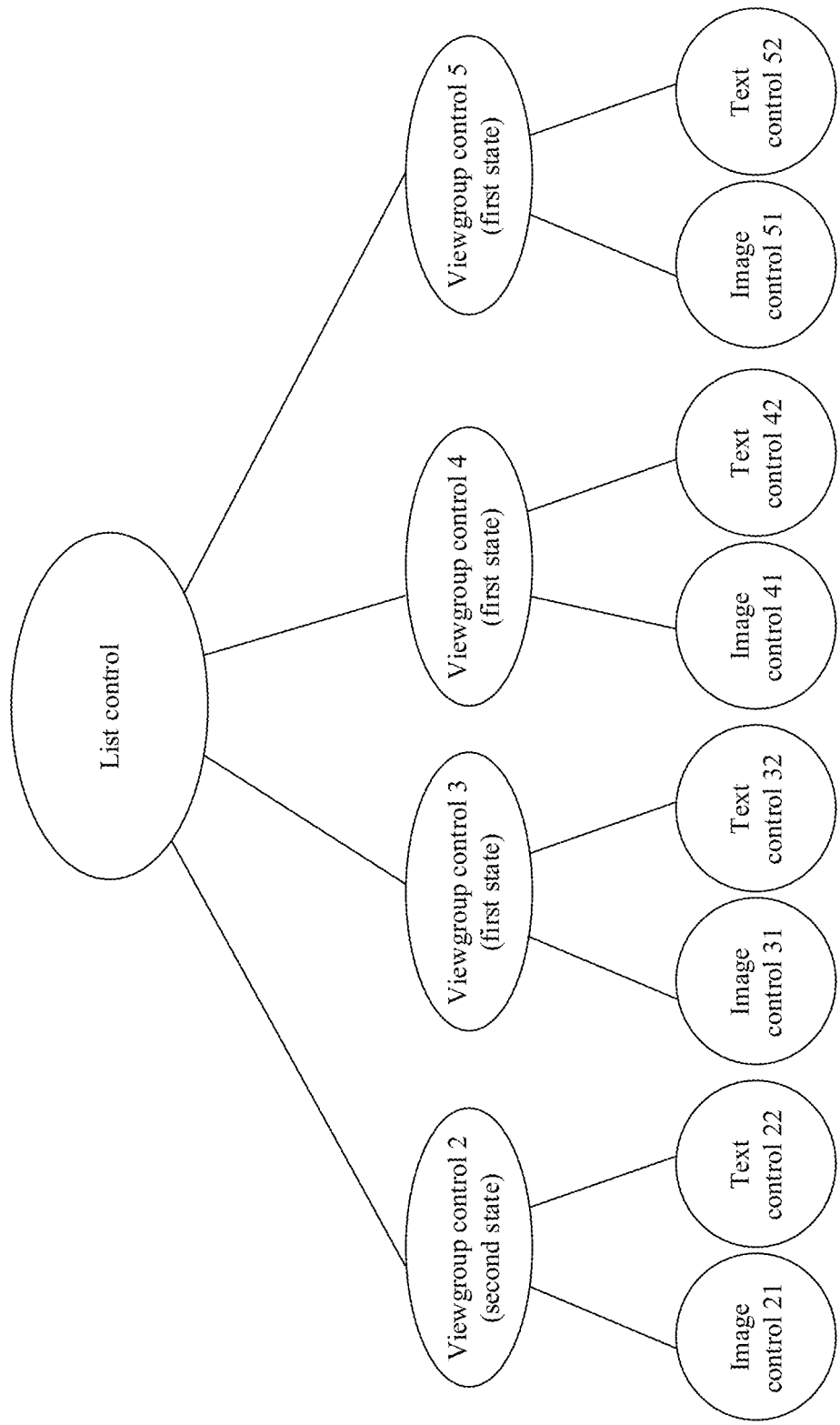
FIG. 12 is a schematic diagram of still another tree structure including controls according to an embodiment of this application.

FIG. 12 is a schematic diagram of still another tree structure including controls according to an embodiment of this application. Refer to FIG. 12. A correspondence between the information about four contacts on the contact page and the controls is shown in Table 4.

TABLE 4

| Contact | Control |
| --- | --- |
| Zhang Er | Viewgroup control 2 (second state), image control 21, text control 22 |
| Zhang San | Viewgroup control 3 (first state), image control 31, text control 32 |
| Zhang Si | Viewgroup control 4 (first state), image control 41, text control 42 |
| Zhang Wu | Viewgroup control 5 (first state), image control 51, text control 52 |

The electronic device measures, lays out, and draws the control shown in FIG. 12 according to the drawing instruction, to obtain a display list of each control on the contact page. In some embodiments, because content in the viewgroup control 3 and the viewgroup control 4 is not updated, the display lists corresponding to the viewgroup control 3 and the viewgroup control 4 may not be updated. The display lists may be shown in FIG. 13A and FIG. 13B.

Figure 13A:
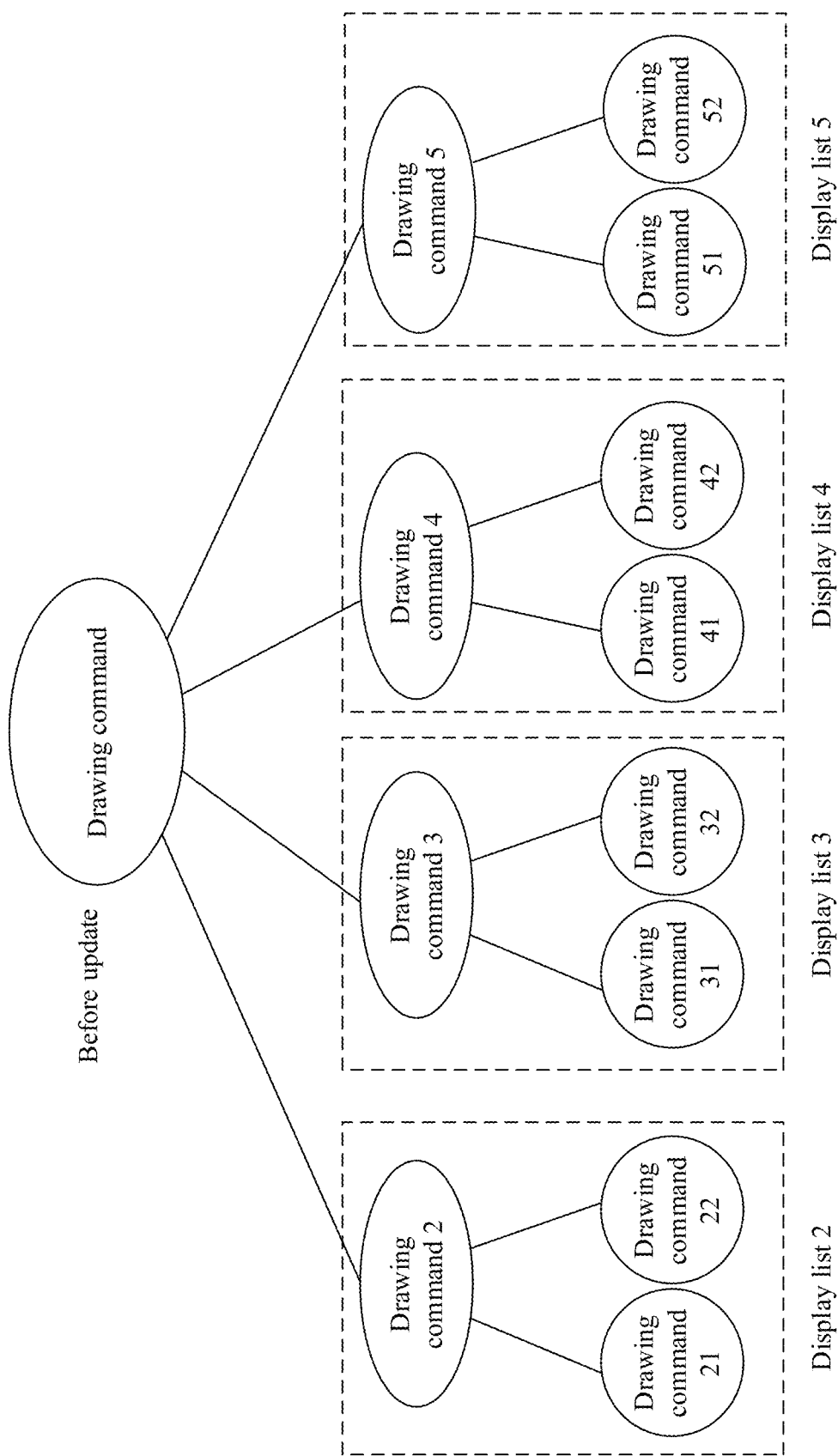
FIG. 13A and FIG. 13B are a schematic diagram of still another tree structure including display lists according to an embodiment of this application.
Figure 13B:
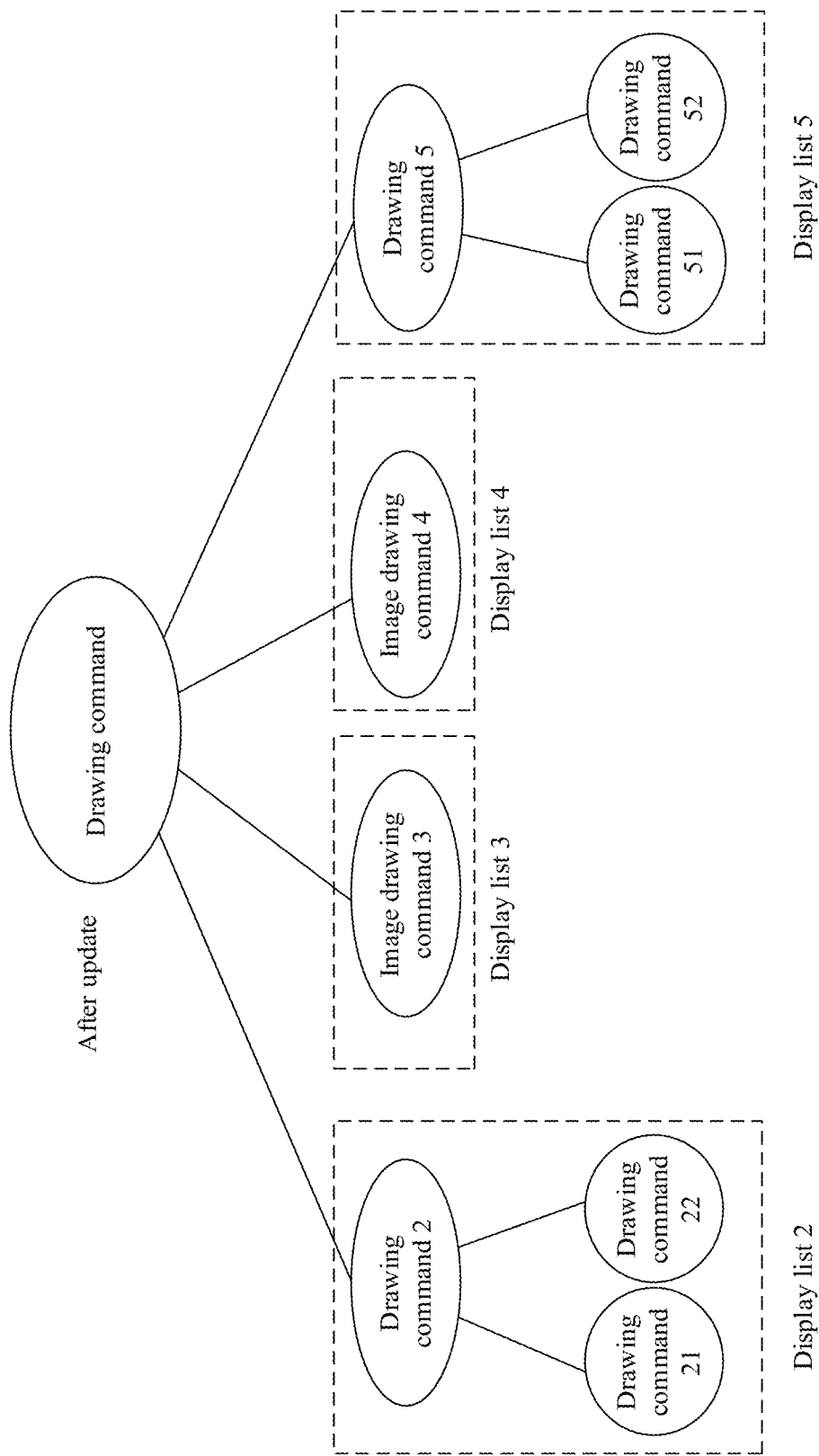

FIG. 13A and FIG. 13B are a schematic diagram of still another tree structure including display lists according to an embodiment of this application. Refer to FIG. 13A and FIG. 13B. The to-be-updated display lists and the updated display lists are included.

Refer to the to-be-updated display lists. A correspondence between the information about four contacts on the contact page and the display lists is shown in Table 5.

TABLE 5

| Contact | Display list | Drawing command |
| --- | --- | --- |
| Zhang Er | Display list 2 | Drawing command 2, drawing command 21, drawing command 22 |
| Zhang San | Display list 3 | Drawing command 3, drawing command 31, drawing command 32 |
| Zhang Si | Display list 4 | Drawing command 4, drawing command 41, drawing command 42 |

TABLE 5-continued

| Contact | Display list | Drawing command |
|---|---|---|
| Zhang Wu | Display list 5 | Drawing command 5, drawing command 51, drawing command 52 |

The electronic device determines that the images respectively corresponding to the viewgroup control 2, the viewgroup control 3, and the viewgroup control 4 exist, and the content in the viewgroup 3 and the viewgroup 4 does not change. In this case, the electronic device generates image drawing instructions corresponding to the viewgroup control 3 and the viewgroup control 4, and updates the corresponding display lists by using the image drawing instructions.

Refer to the updated display lists. A correspondence between the information about four contacts on the contact page and the display lists is shown in Table 6.

TABLE 6

| Contact | Display list | Drawing command |
|---|---|---|
| Zhang Er | Display list 2 | Drawing command 2, drawing command 21, drawing command 22 |
| Zhang San | Display list 3 | Image drawing command 3 |
| Zhang Si | Display list 4 | Image drawing command 4 |
| Zhang Wu | Display list 5 | Drawing command 5, drawing command 51, drawing command 52 |

The electronic device renders each control on the contact page based on the updated display list in FIG. 13B. A rendering process is shown as a rendering process 2 in FIG. 9B. After the rendering shown in the rendering process 2 in FIG. 9B, the page 903 is obtained.

Refer to the rendering process 2. In a process of rendering controls corresponding to the contacts "Zhang San" and "Zhang Si", rendering is separately performed based on the corresponding images, to reduce a rendered object, so as to reduce a rendered pixel and system resources, and improve rendering efficiency.

Figure 14:
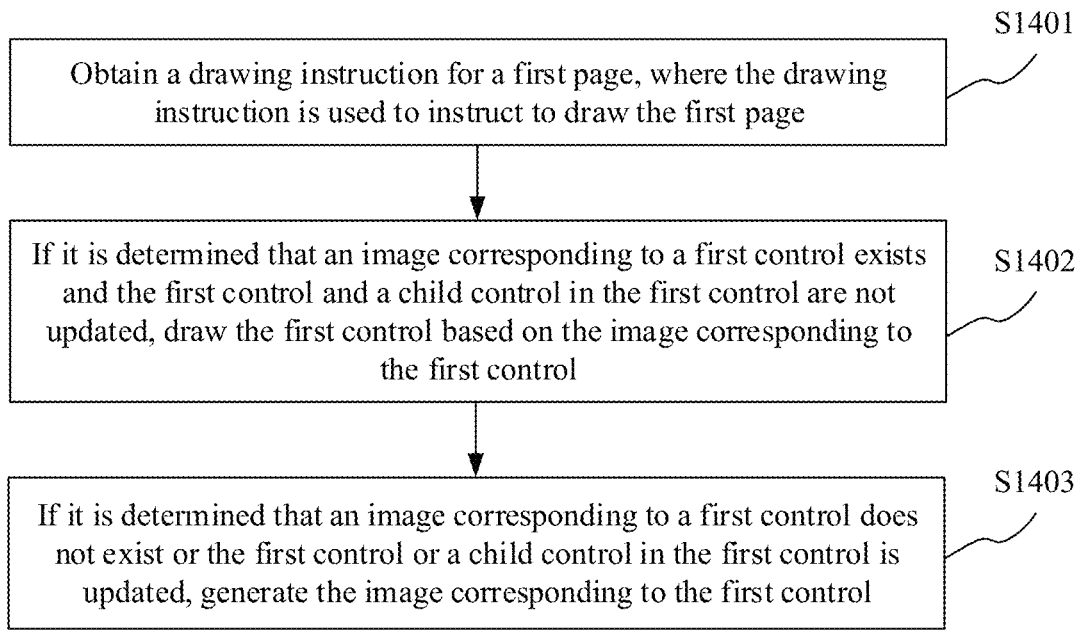
FIG. 14 is a schematic flowchart of another page drawing control method according to an embodiment of this application.

Based on any one of the foregoing embodiments, the following describes a page drawing method with reference to FIG. 14.

FIG. 14 is a schematic flowchart of another page drawing control method according to an embodiment of this application. Refer to FIG. 14. The method may include the following steps.

S1401: Obtain a drawing instruction for a first page, where the drawing instruction is used to instruct to draw the first page, the first page includes a first control, and the first control includes at least one child control.

It should be noted that, for a process of performing S1401, refer to the process of performing S401. Details are not described herein again.

S1402: If it is determined that an image corresponding to the first control exists and the first control and the child control in the first control are not updated, draw the first control based on the image corresponding to the first control.

It should be noted that, whether the image corresponding to the first control exists and whether the first control and the child control in the first control are updated may be determined according to the method shown in S404. Details are not described herein again.

It should be noted that, for a process of drawing the first control based on the image corresponding to the first control, refer to S405 to S408. Details are not described herein again.

S1403: If it is determined that an image corresponding to the first control does not exist or the first control or the child control in the first control is updated, generate the image corresponding to the first control.

In some embodiments, after the image corresponding to the first control is generated, the image corresponding to the first control may be stored.

In some embodiments, after S1403, the first control may be drawn based on the image corresponding to the first control, or the first control may be drawn according to a rendering process shown in FIG. 8.

In the embodiment shown in FIG. 14, in a page drawing process, for a viewgroup control on a page, an image of the viewgroup control may be first generated and stored. The image includes an image corresponding to the viewgroup control and an image corresponding to each child control in the viewgroup control. In this way, in the page drawing process, if content in a viewgroup control does not change and an image of the viewgroup control exists, the viewgroup control may be drawn based on the image, to reduce drawn content on the page, so as to improve drawing efficiency.

Figure 15:
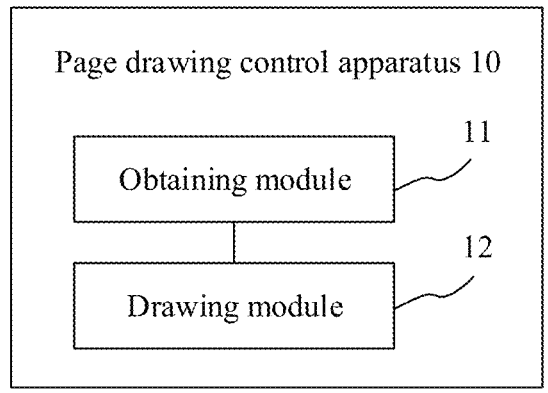
FIG. 15 is a schematic diagram of a structure of a page drawing control apparatus according to an embodiment of this application.

FIG. 15 is a schematic diagram of a structure of a page drawing control apparatus according to an embodiment of this application. Refer to FIG. 15. A page drawing control apparatus 10 may include an obtaining module 11 and a drawing module 12.

The obtaining module 11 is configured to obtain a drawing instruction for a first page, where the drawing instruction is used to instruct to draw the first page, the first page includes a first control, and the first control includes at least one child control.

The drawing module 12 is configured to: if it is determined that an image corresponding to the first control exists and the first control and the child control in the first control are not updated, draw the first control based on the image corresponding to the first control.

The drawing module 12 is further configured to: if it is determined that an image corresponding to the first control does not exist or the first control or the child control in the first control is updated, generate the image corresponding to the first control and draw the first control.

In some embodiments, the obtaining module 11 may perform S401 in the embodiment in FIG. 4 and S1401 in the embodiment in FIG. 14.

In some embodiments, the drawing module 12 may perform S402 to S410 in the embodiment in FIG. 4 and S1402 and S1403 in the embodiment in FIG. 14.

It should be noted that the page drawing control apparatus 10 in this embodiment of this application may perform the technical solutions shown in the foregoing method embodiments. Implementation principles and beneficial effects of the page drawing control apparatus 10 are similar to those of the technical solutions, and details are not described herein again.

In some embodiments, the drawing module 12 is specifically configured to:
generate an image drawing command corresponding to the image;
update a drawing command in a display list of the first control to the image drawing command; and
draw the first control based on an updated display list of the first control.

In some embodiments, the drawing module 12 is specifically configured to:
obtain attribute information of the first control, where the attribute information includes a size of the first control, a size of each child control in the first control, and a location of each child control in the first control; and obtain, based on the attribute information and a preset draw function, the image corresponding to the first control.

In some embodiments, the drawing module 12 is specifically configured to:

generate the image corresponding to the first control, and draw the first control based on the generated image corresponding to the first control.

In some embodiments, the drawing module 12 is specifically configured to:

generate the image corresponding to the first control;

obtain the display list of the first control, where the display list includes a drawing command for the first control and a drawing command for each child control in the first control; and draw the first control based on the display list.

Figure 16:
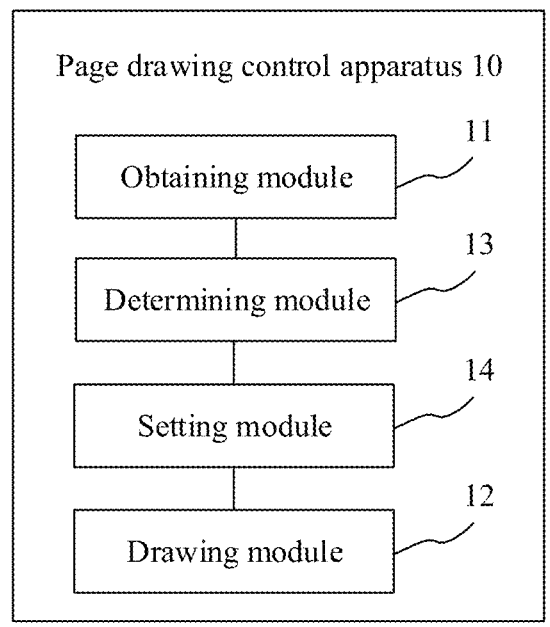
FIG. 16 is a schematic diagram of a structure of another page drawing control apparatus according to an embodiment of this application.

FIG. 16 is a schematic diagram of a structure of another page drawing control apparatus according to an embodiment of this application. Based on the embodiment shown in FIG. 15, refer to FIG. 16. The page drawing control apparatus 10 may further include a determining module 13. The determining module 13 is configured to:

if a state of the first control is a first state, determine that the first control and the child control in the first control are not updated, or if a state of the first control is a second state, determine that the first control or the child control in the first control is updated.

In some embodiments, the page drawing control apparatus 10 further includes a setting module 14.

The setting module 14 is configured to: after it is detected that the first control or the child control in the first control is updated, set the state of the first control to the second state.

The setting module 14 is further configured to: after the drawing module 12 generates the image corresponding to the first control, set the state of the first control to the first state.

In some embodiments, the first control is a viewgroup control, and the child control in the first control is a view control.

It should be noted that the page drawing control apparatus 10 in this embodiment of this application may perform the technical solutions shown in the foregoing method embodiments. The implementation principles and the beneficial effects of the page drawing control apparatus 10 are similar to those of the technical solutions, and details are not described herein again.

Figure 17:
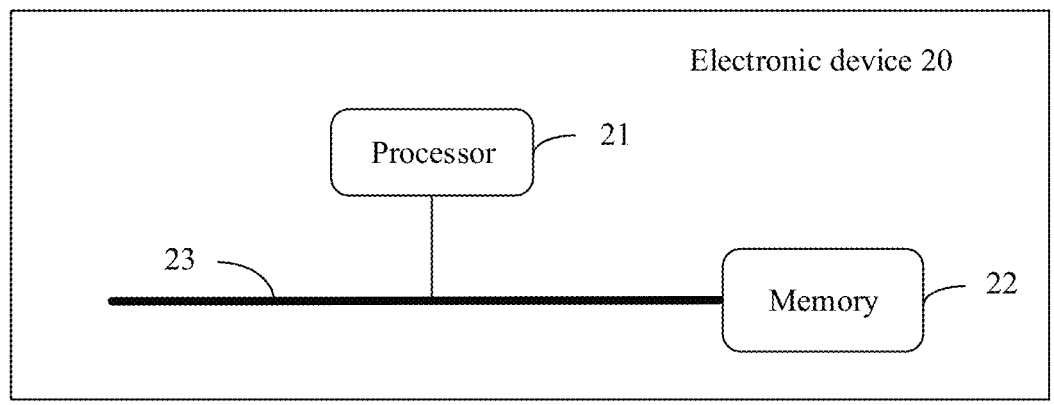
FIG. 17 is a schematic diagram of a structure of an electronic device according to an embodiment of this application.

FIG. 17 is a schematic diagram of a structure of an electronic device according to an embodiment of this application. Refer to FIG. 17. An electronic device 20 may include a processor 21, a memory 22, and a communications bus 23. The processor 21 communicates with the memory 22 through the communications bus 23. The processor 21 executes program instructions in the memory 22, and performs the following steps according to the program instructions:

obtaining a drawing instruction for a first page, where the drawing instruction is used to instruct to draw the first page, the first page includes a first control, and the first control includes at least one child control; and if it is determined that an image corresponding to the first control exists and the first control and the child control in the first control are not updated, drawing the first control based on the image corresponding to the first control, or if it is determined that an image corresponding to the first control does not exist or the first control or the child control in the first control is updated, generating the image corresponding to the first control and drawing the first control.

In some embodiments, the processor 21 may implement functions of the obtaining module 11, the drawing module 12, the determining module 13, and the setting module 14 in the embodiments in FIG. 15 and FIG. 16.

In some embodiments, the processor 21 may include a CPU. In this case, all steps performed by the processor 21 may be performed by the CPU.

In some embodiments, the processor 21 may include a CPU and a GPU. In this case, steps performed by the processor 21 may be jointly performed by the CPU and the GPU. For example, the CPU may obtain the drawing instruction for the first page, and draw the first control based on the image corresponding to the first control. The GPU may generate the image corresponding to the first control. For example, the CPU may obtain the drawing instruction for the first page. The GPU may generate the image corresponding to the first control, and draw the first control based on the image corresponding to the first control.

In some embodiments, the processor 21 may alternatively be another general-purpose processor, a digital signal processor (DSP), an application-specific integrated circuit (ASIC), or the like. The general-purpose processor may be a microprocessor, or the processor may be any conventional processor or the like. Steps in the method embodiments disclosed with reference this application may be directly performed by a hardware processor, or may be performed by using a combination of hardware and software modules in a processor.

In some embodiments, the electronic device may further include a display, and the display is configured to display the drawn first control.

It should be noted that the electronic device 20 in this embodiment of this application may perform the technical solutions shown in the foregoing method embodiments. Implementation principles and beneficial effects of the electronic device 20 are similar to those of the technical solutions, and details are not described herein again.

In some embodiments, the processor 21 is specifically configured to:

generate an image drawing command corresponding to the image;

update a drawing command in a display list of the first control to the image drawing command; and draw the first control based on an updated display list of the first control.

In some embodiments, the processor 21 is specifically configured to:

obtain attribute information of the first control, where the attribute information includes a size of the first control, a size of each child control in the first control, and a location of each child control in the first control; and obtain, based on the attribute information and a preset draw function, the image corresponding to the first control.

In some embodiments, the processor 21 is specifically configured to:

generate the image corresponding to the first control, and draw the first control based on the generated image corresponding to the first control.

In some embodiments, the processor 21 is specifically configured to:

generate the image corresponding to the first control;

obtain the display list of the first control, where the display list includes a drawing command for the first control and a drawing command for each child control in the first control; and draw the first control based on the display list.

In some embodiments, the processor 21 is specifically configured to:

if a state of the first control is a first state, determine that the first control and the child control in the first control are not updated, or if a state of the first control is a second state, determine that the first control or the child control in the first control is updated.

In some embodiments, the processor 21 is further configured to:

after detecting that the first control or the child control in the first control is updated, set the state of the first control to the second state; and set the state of the first control to the first state.

In some embodiments, the first control is a viewgroup control, and the child control in the first control is a view control.

It should be noted that the electronic device 20 in this embodiment of this application may perform the technical solutions shown in the foregoing method embodiments. Implementation principles and beneficial effects of the electronic device 20 are similar to those of the technical solutions, and details are not described herein again.

Figure 18:
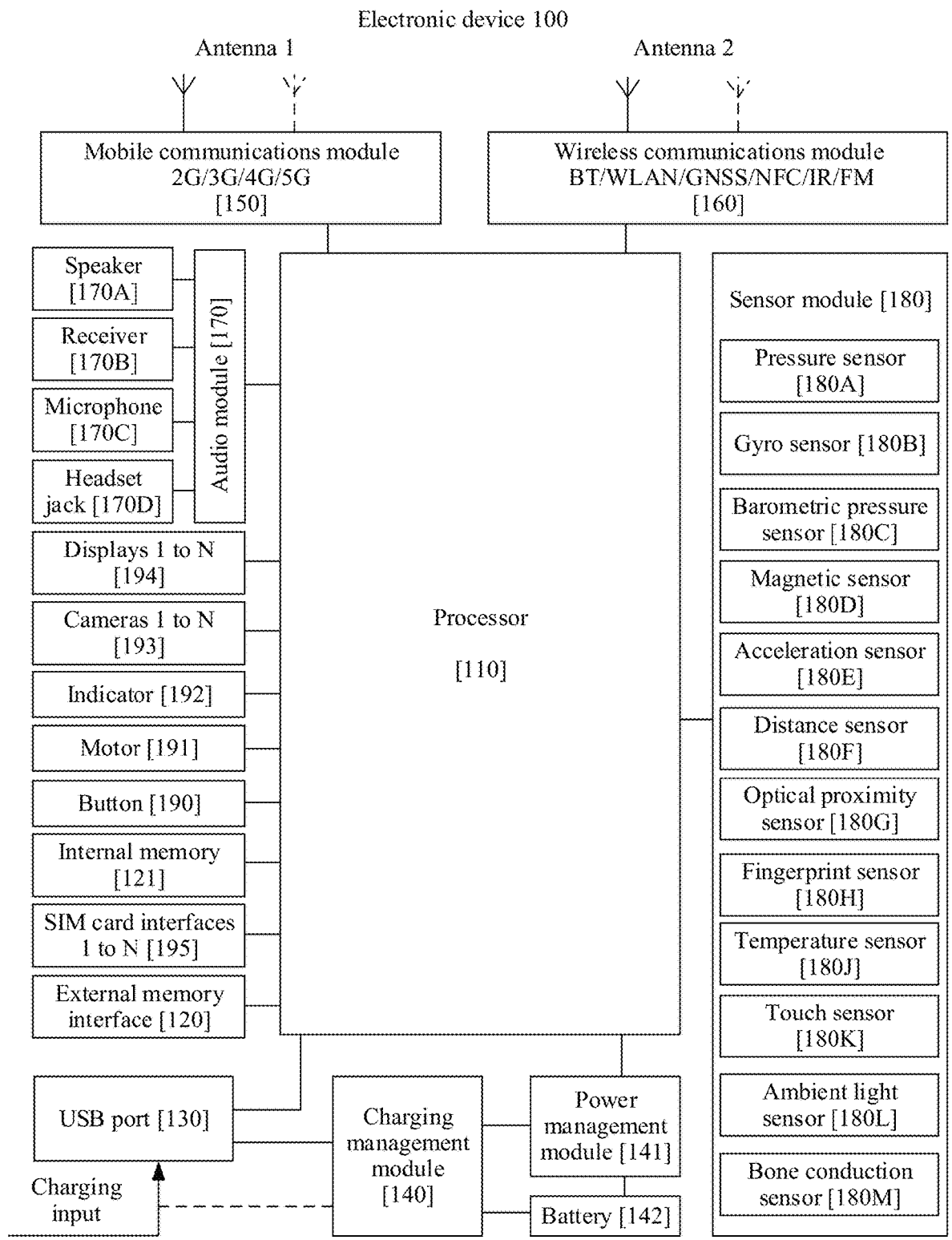
FIG. 18 is a schematic diagram of a structure of another electronic device according to an embodiment of this application.

FIG. 18 is a schematic diagram of a structure of another electronic device according to an embodiment of this application. Refer to FIG. 18. An electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction fetching and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to the application processor. The application processor outputs a sound signal by using an audio device (not limited to the speaker 170A, the receiver 170B, and the like), or displays an image or a video by using the display 194. In some embodiments, the modem processor may be an independent component. In some other embodiments, the modem processor may be independent of the processor 110, and disposed in a same device with the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components that integrate at least one communications processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device 100 may include one or N displays 194, where N is a positive integer greater than 1.

The electronic device 100 may implement the photographing function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, and may further include a nonvolatile memory, for example, at least one magnetic disk storage component, a flash memory component, or a universal flash storage (UFS). The processor 110 runs the instructions stored in the internal memory 121 and/or the instructions stored in the memory disposed in the processor, to perform various function applications of the electronic device 100 and data processing.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may further be configured to encode and decode an audio signal. In some embodiments, the audio module 170 may be disposed in the processor 110, or some function modules of the audio module 170 are disposed in the processor 110.

It should be noted that the electronic device shown in FIG. 17 may be the same as the electronic device shown in FIG. 18, or the electronic device shown in FIG. 17 is a part of the electronic device shown in FIG. 18.

An embodiment of this application provides a storage medium. The storage medium is configured to store a computer program, and the computer program is used to implement the page drawing control method in the foregoing embodiments.

An embodiment of this application provides a computer program product. The computer program product includes instructions, and when the instructions are executed, a computer is enabled to perform the page drawing control method.

An embodiment of this application provides a system-on-a-chip or a system chip. The system-on-a-chip or the system chip may be applied to an electronic device, and the system-on-a-chip or the system chip includes at least one communications interface, at least one processor, and at least one memory. The communications interface, the memory, and the processor are interconnected through a bus, and the processor executes instructions stored in the memory, so that the terminal device is enabled to perform the page drawing control method.

All or some of the steps in the method embodiments may be implemented by hardware related to program instructions. The foregoing program may be stored in a readable memory. When the program is executed, the steps of the foregoing method embodiments are performed. The foregoing memory (e.g., a storage medium) includes a read-only memory (ROM), a RAM, a flash memory, a hard disk, a solid-state drive, a magnetic tape, a floppy disk, an optical disc, and any combination thereof.

The embodiments of this application are described with reference to the flowcharts and/or block diagrams of the method, the device (e.g., system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processing unit of another programmable data processing device to generate a machine, so that the instructions executed by a computer or the processing unit of the another programmable data processing device generate an apparatus configured to implement a specific function in one or more procedures in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to the embodiments of this application without departing from the spirit and scope of this application. This application is also intended to cover these modifications and variations of the embodiments of this application provided that they fall within the scope of protection defined by the following claims and their equivalent technologies.

In this application, the term "including" and a variant thereof may refer to non-limitative inclusion, and the term "or" and a variant thereof may refer to "and/or". In this application, the terms "first", "second", and the like are intended to distinguish between similar objects but do not necessarily indicate a specific order or sequence. In this application, "a plurality of" means two or more than two. The term "and/or" describes an association between associated objects and indicates that three relationships may exist. For example, A and/or B may indicate the following three cases: Only A exists, both A and B exist, and only B exists. The character "/" generally indicates an "or" relationship between the associated objects.

What is claimed is:

1. A method, comprising:
   obtaining a drawing instruction for a first page, wherein the drawing instruction is used to instruct to draw the first page, the first page comprises a first control, and the first control comprises at least one child control; and
   in response to it is determined that an image corresponding to the first control exists and the first control and all the child controls in the first control are not updated, drawing the first control based on the image corresponding to the first control,
   in response to it is determined that an image corresponding to the first control does not exist or the first control or the at least one child control in the first control is updated, generating the image corresponding to the first control and drawing the first control, wherein the generating the image corresponding to the first control and drawing the first control comprises:
      generating the image corresponding to the first control;
      obtaining a display list of the first control, wherein the display list comprises a drawing command for the first control and a drawing command for each child control in the first control; and
      drawing the first control based on the display list.

2. The method according to claim 1, wherein the drawing the first control based on the image corresponding to the first control comprises:
   generating an image drawing command corresponding to the image;
   updating a drawing command in the display list of the first control to the image drawing command; and
   drawing the first control based on an updated display list of the first control.

3. The method of claim 1, wherein the generating the image corresponding to the first control comprises:
   obtaining attribute information of the first control, wherein the attribute information comprises at least one of a size of the first control, a size of each child control in the first control, or a location of each child control in the first control; and
   obtaining, based on at least one of the attribute information or a preset draw function, the image corresponding to the first control.

4. The method of claim 1, wherein the generating the image corresponding to the first control and drawing the first control comprises:
   generating the image corresponding to the first control, and drawing the first control based on the generated image corresponding to the first control.

5. The method of claim 1, wherein
   determining that the first control and all the child controls in the first control are not updated comprises:
   in response to a state of the first control is a first state, determining that the first control and all the child controls in the first control are not updated; and
   determining that the first control or the at least one child control in the first control is updated comprises:
   in response to the state of the first control is a second state, determining that the first control or the at least one child control in the first control is updated.

6. The method of claim 5, wherein the method further comprises:
   after it is detected that the first control or the at least one child control in the first control is updated, setting the state of the first control to the second state; and
   after the generating the image corresponding to the first control, the method further comprises:
   setting the state of the first control to the first state.

7. The method of claim 1, wherein the first control is a viewgroup control, and the child control in the first control is a view control.

8. An electronic device, comprising a memory and a processor, wherein the processor executes program instructions in the memory, so that the electronic device is enabled to perform following operations:
   obtaining a drawing instruction for a first page, wherein the drawing instruction is used to instruct to draw the first page, the first page comprises a first control, and the first control comprises at least one child control; and
   in response to it is determined that an image corresponding to the first control exists and the first control and all the child controls in the first control are not updated, drawing the first control based on the image corresponding to the first control,
   in response to it is determined that an image corresponding to the first control does not exist or the first control or the at least one child control in the first control is updated, generating the image corresponding to the first control and drawing the first control, wherein the generating the image corresponding to the first control and drawing the first control comprises:
      generating the image corresponding to the first control;
      obtaining a display list of the first control, wherein the display list comprises a drawing command for the first control and a drawing command for each child control in the first control; and
      drawing the first control based on the display list.

9. The electronic device of claim 8, wherein the drawing the first control based on the image corresponding to the first control comprises:
   generating an image drawing command corresponding to the image;
   updating a drawing command in the display list of the first control to the image drawing command; and
   drawing the first control based on an updated display list of the first control.

10. The electronic device of claim 8, wherein the generating the image corresponding to the first control comprises:
   obtaining attribute information of the first control, wherein the attribute information comprises at least one of a size of the first control, a size of each child control in the first control, or a location of each child control in the first control; and
   obtaining, based on at least one of the attribute information or a preset draw function, the image corresponding to the first control.

11. The electronic device of claim 8, wherein the generating the image corresponding to the first control and drawing the first control comprises:
generating the image corresponding to the first control, and drawing the first control based on the generated image corresponding to the first control.

12. The electronic device of claim 8, wherein determining that the first control and all the child controls in the first control are not updated comprises:
in response to a state of the first control is a first state, determining that the first control and all the child controls in the first control are not updated, or
in response to a state of the first control is a second state, determining that the first control or the at least one child control in the first control is updated.

13. The electronic device of claim 12, wherein the processor is further configured to:
after detecting that the first control or the child control in the first control is updated, set the state of the first control to the second state, and
after generating the image corresponding to the first control, set the state of the first control to the first state.

14. The electronic device of claim 8, wherein the first control is a viewgroup control, and the child control in the first control is a view control.

15. A non-transitory computer-readable storage medium having program instructions stored therein, which when executed by a processor, cause the processor to perform operations, the operations comprising:
obtaining a drawing instruction for a first page, wherein the drawing instruction is used to instruct to draw the first page, the first page comprises a first control, and the first control comprises at least one child control; and
in response to it is determined that an image corresponding to the first control exists and the first control and all the child controls in the first control are not updated, drawing the first control based on the image corresponding to the first control,
in response to it is determined that an image corresponding to the first control does not exist or the first control or the at least one child control in the first control is updated, generating the image corresponding to the first control and drawing the first control, wherein the generating the image corresponding to the first control and drawing the first control comprises:
generating the image corresponding to the first control;
obtaining a display list of the first control, wherein the display list comprises a drawing command for the first control and a drawing command for each child control in the first control; and
drawing the first control based on the display list.

16. The non-transitory computer-readable storage medium according to claim 15, wherein the drawing the first control based on the image corresponding to the first control comprises:
generating an image drawing command corresponding to the image;
updating a drawing command in the display list of the first control to the image drawing command; and
drawing the first control based on an updated display list of the first control.

17. The non-transitory computer-readable storage medium according to claim 15, wherein the generating the image corresponding to the first control comprises:
obtaining attribute information of the first control, wherein the attribute information comprises at least one of a size of the first control, a size of each child control in the first control, or a location of each child control in the first control; and
obtaining, based on at least one of the attribute information or a preset draw function, the image corresponding to the first control.

18. The non-transitory computer-readable storage medium according to claim 15, wherein the generating the image corresponding to the first control and drawing the first control comprises:
generating the image corresponding to the first control, and drawing the first control based on the generated image corresponding to the first control.

* * * * *